US012165017B1

(12) United States Patent
Grossman

(10) Patent No.: US 12,165,017 B1
(45) Date of Patent: *Dec. 10, 2024

(54) METHOD AND SYSTEM FOR GENERATING AN ALERT REGARDING A MULTI-INPUT SUPERVISED MACHINE LEARNING MODEL

(71) Applicant: Wells Fargo Bank, N.A., San Francisco, CA (US)

(72) Inventor: Nathan Grossman, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 983 days.

This patent is subject to a terminal disclaimer.

(21) Appl. No.: 17/084,087

(22) Filed: Oct. 29, 2020

Related U.S. Application Data

(60) Provisional application No. 63/057,751, filed on Jul. 28, 2020.

(51) Int. Cl.
*G06N 20/00* (2019.01)
*G06F 17/17* (2006.01)

(52) U.S. Cl.
CPC ............. *G06N 20/00* (2019.01); *G06F 17/17* (2013.01)

(58) Field of Classification Search
CPC ................................ G06N 20/00; G06F 17/17
See application file for complete search history.

(56) References Cited

U.S. PATENT DOCUMENTS

| | | | |
|---|---|---|---|
| 2003/0200189 A1 | 10/2003 | Meng et al. | |
| 2017/0330109 A1* | 11/2017 | Maughan | G06N 5/04 |
| 2018/0136617 A1 | 5/2018 | Xu et al. | |
| 2019/0034586 A1 | 1/2019 | Pirrotte et al. | |
| 2019/0164017 A1 | 5/2019 | Chen et al. | |
| 2020/0012900 A1* | 1/2020 | Walters | G06F 17/15 |
| 2021/0133632 A1 | 5/2021 | Elprin et al. | |
| 2023/0316045 A1* | 10/2023 | Rama | G06N 3/045 |
| | | | 706/25 |

OTHER PUBLICATIONS

Chi-Squared Test, Wikipedia, Aug. 8, 2020.

(Continued)

*Primary Examiner* — Nhat Huy T Nguyen
(74) *Attorney, Agent, or Firm* — Foley & Lardner LLP

(57) ABSTRACT

A machine learning model engine executes a machine learning model that has been trained with training data and processes scoring data to generate predictions. A machine learning model analyzer is configured to evaluate the machine learning model. The machine learning model analyzer determines a plurality of drift metrics for the plurality of input variables to compare the distribution of the training data to the distribution of the scoring data. Each of the plurality of drift metrics is associated with one of the plurality of input variables. The machine learning model analyzer also determines an overall drift metric for the combination of the input variables. The plurality of input variables are weighted in the overall drift metric in accordance with the plurality of feature importances. The machine learning model analyzer generates an alert based on the overall distribution of the training data relative to the overall distribution of the scoring data.

16 Claims, 8 Drawing Sheets

(56) References Cited

OTHER PUBLICATIONS

Comparison of the Goodness of Fit Tests—The Pearson Chi-Square and Kolmogorov-Smirnon Tests, Hsiao-Mei Wang, Ling Tung University, Taiwan pp. 57-63.
Goodness-of-Fit Test, Wikipedia, Aug. 8, 2020.
The sensitivity of Chi Squared Goodness of fit test to the partitioning of Data, Boero, Economic Review, vol. 23 No 4 pp. 341-370 2004.

\* cited by examiner

METHOD AND SYSTEM FOR GENERATING AN ALERT REGARDING A MULTI-INPUT SUPERVISED MACHINE LEARNING MODEL

CROSS-REFERENCE TO RELATED APPLICATIONS

This application claims the benefit of U.S. Prov. Ser. No. 63/057,751, filed Jul. 28, 2020, entitled "Method and System for Generating an Alert Regarding a Multi-Input Supervised Machine Learning Model," hereby incorporated by reference in its entirety.

BACKGROUND

Predictive modeling, and more specifically, supervised machine learning, is the process of using known results to create, process, and validate a model that can be used to forecast future outcomes. It is a tool used in predictive analytics, a data mining technique that attempts to predict an outcome, e.g., the probability of fraud in connection with a transaction, the probability that a loan might be defaulted on, etc. Predictive analytics uses predictors or known features to create machine learning models that are used in obtaining an output. A machine learning model reflects how different points of data interact with each other to produce an outcome. For sake of brevity, when reference is made herein to predictive modeling or machine learning, it is to be understood that supervised machine learning is being discussed.

SUMMARY

Aspects of the present disclosure relate generally to artificial intelligence in the field of computer science, and more particularly to systems and methods for quantifying the impact of data drift on a supervised machine learning model.

In various example arrangements, a system comprises a machine learning model engine and a machine learning model analyzer. The machine learning model engine executes a machine learning model having a plurality of input variables and a plurality of feature importances. Each of the plurality of feature importances is associated with one of the plurality of input variables. The machine learning model has been trained with training data and processes scoring data to generate predictions. The machine learning model analyzer is configured to evaluate the machine learning model. The machine learning model analyzer determines a plurality of drift metrics for the plurality of input variables. The plurality of drift metrics compare the distribution of the training data to the distribution of the scoring data. Each of the plurality of drift metrics is associated with one of the plurality of input variables. The machine learning model analyzer also determines, based on the plurality of drift metrics for the plurality of input variables, an overall drift metric for the combination of the input variables. The plurality of input variables are weighted in the overall drift metric in accordance with the plurality of feature importances. The overall drift metric compares an overall distribution of the training data to an overall distribution of the scoring data. The machine learning model analyzer also generates an alert based on the overall distribution of the training data relative to the overall distribution of the scoring data.

In various example arrangements, the training data pertains to a first period of time and the scoring data pertains to a second period of time. In general, the first period of time is earlier than the second period of time. The overall drift metric provides a measure of how far the distribution of the scoring data has drifted away from the distribution of the training data in the interval between the first and second periods of time.

In various example arrangements, the overall drift metric provides a leading indicator of a performance (e.g., accuracy, sensitivity, specificity, recall or other measures of efficacy) of the machine learning model in generating the predictions based on the scoring data. The overall drift metric being a leading indicator as compared to information regarding actual outcomes associated with each of the predictions generated in connection with the scoring data, the information regarding the actual outcomes of each of the predictions being a lagging indicator as compared to the overall drift metric.

In various example arrangements, the overall drift metric is determined without using the information regarding the actual outcomes, such that the indication of the performance of the machine learning model is determined and the alert is generated by the machine learning model analyzer earlier in time than possible if the information regarding the actual outcomes were utilized.

In various example arrangements, the training data includes both numeric data and categorical data, and wherein the scoring data includes both numeric data and categorical data. For each input variable for which the training data and the scoring data are numeric data, the machine learning model analyzer is configured to place the numeric training data and the numeric scoring data into a plurality of bins. Each of the plurality of bins comprises a numeric range defined by a minimum value and a maximum value. To this end, the machine learning model analyzer assigns the numeric training data and the numeric scoring data are assigned to one of the plurality of bins for the input variable based on whether a particular data point lies within the numeric range for the bin. The bin counts are determined for each bin of each input variable for which the training data and the scoring data are numeric data. For example, in a preferred embodiment, the bin count for each bin is calculated as the number of observations located in that bin.

In various example arrangements, a calibration curve is generated that presents the model performance as a function of the overall drift metric. That is, the calibration curve presents a plurality of model performance values and a plurality of overall drift metric values, wherein each model performance value is associated with a corresponding overall drift metric value. It is determined that an estimated model performance is below a threshold by comparing the drift metric to the calibration curve. An alert is generated based on the estimated model performance being below the threshold.

These and other features, together with the organization and manner of operation thereof, will become apparent from the following detailed description when taken in conjunction with the accompanying drawings.

BRIEF DESCRIPTION OF THE FIGURES

Like reference numbers and designations in the various drawings indicate like elements.

DETAILED DESCRIPTION

Figure 1:
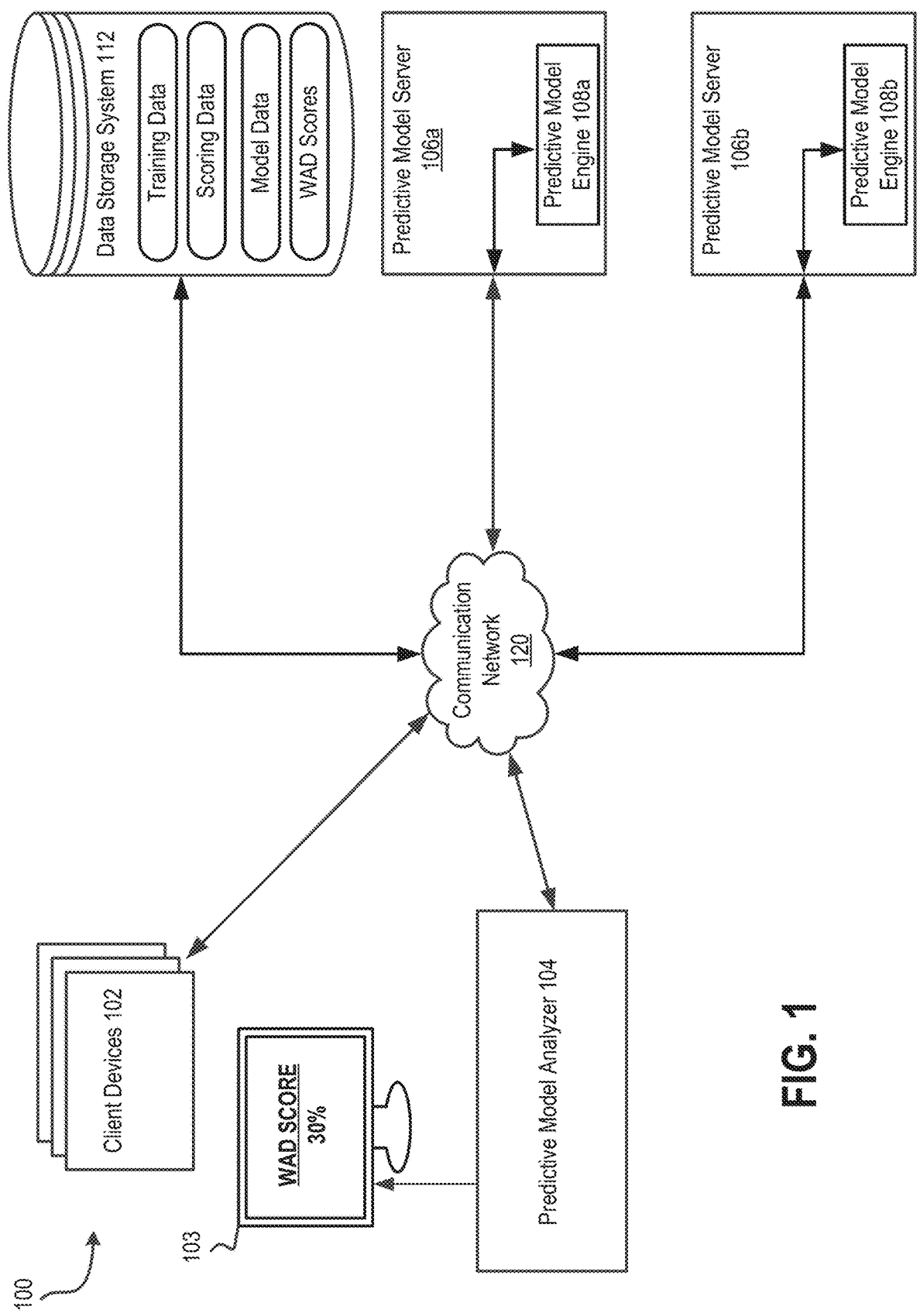
FIG. 1 is a block diagram depicting an example environment for quantifying the impact of concept drift on a machine learning model, according to some arrangements.

When a machine learning model is deployed into production, the performance (e.g., accuracy, sensitivity, specificity, recall or other measures of efficacy) of the machine learning model can change over time. One cause for this change may be as a result of data drift (also referred to as, "variable drift", "model drift", or "concept drift"), which is when there is a systemic change over time between the training data used to train the machine learning model and the scoring data that is observed when the machine learning model is in production. Hence, as a result of data drift, the performance of the machine learning model may decrease over time.

It is often difficult to determine when it is necessary to re-train a machine learning model as a result of data drift. To determine when to re-train the model, a data drift metric may be computed for each input variable of the machine learning model. However, calculating a plurality of drift metrics for a machine learning model fails to provide a meaningful indication as to whether the machine learning model should be re-trained. For example, a first input variable of a plurality of input variables may have a higher drift metric than a second input variable. If the first input variable happens to have a negligible impact (also referred to herein as, "feature importance") on the output prediction, then it may not be necessary to re-train the model. (The feature importance of a particular input variable is sometimes mathematically represented by a weighting coefficient for the input variable, with different input variables of the model having different weighting coefficients. The term "weighting coefficient" is a specific example of the more general term "feature importance." For simplicity, in the following discussion, the term "weighting coefficient" will be used, although it will be understood that other types of feature importances may be used as well. In this vein, it may also be noted that the terms "input variable" and "feature" are used interchangeably herein.) In some situations, some of the input variables may be numeric variables, whereas other of the input variables may be categorical variables, which makes an "apples-to-apples" comparison even more difficult. Simply put, the plurality of drift metrics may fail to account for the differences in feature importance of the plurality of input variables, not to mention the different types of input variables. Furthermore, the greater the number of input variables of a model results in a greater number of drift metrics, which in turn, makes the re-training determination process more challenging.

According to embodiments herein, an overall drift metric for a machine learning model across a plurality of input variables is calculated. Specifically, a weighted average drift (WAD) score/metric is calculated in a way that accounts for the differences in feature importances of the plurality of input variables. (Herein, the terms "WAD score" and "WAD metric" are used interchangeably.) The WAD score may then be used to determine whether it is necessary to re-train the machine learning model.

In general, as described below, one or more computing devices perform a series of operations to train, utilize, and monitor the performance of one or more machine learning model engines executing on a computing system. These operations may be categorized into two phases: a "Training Phase" for training the one or more machine learning model engines and a "Scoring Phase" during which the machine learning model is put into production and used for its intended purpose (e.g., used to generate scores reflecting the probability of a particular outcome). During the "Training Phase," a computing device (e.g., a machine learning model analyzer 104 in FIG. 1, or another computing device not shown in FIG. 1) uses a set of training data consisting of a plurality of input variables (e.g., which may each be categorical or numeric) to train a machine learning model engine.

As part of training the machine learning model, the computing device generates (and assigns) a plurality of weighting coefficients (i.e., feature importances) corresponding to the plurality of input variables of the training data. There is a 1:1 correspondence between the weighting coefficients and the input variables. For example, regression analysis may be used to select an optimal set of weighting coefficients that in combination most accurately predict the known/correct outcome in the training data (sometimes referred to as "ground truth") based on the plurality of input variables of the training data. Each weighting coefficient is a measure of how influential (e.g., significant, impactful, degree of correlation, etc.) the computing device determined that a single respective input variable of the training data should be on the output prediction that the machine learning model engine generates. An input variable having a higher feature importance value (weighting coefficient) has a greater impact on the predictions made by the machine learning model engine than an input variable having a lower feature importance value. Typically, but not necessarily, the weighting coefficients sum to a value of '1.' For example, the computing device may train a machine learning model engine with a set of training data associated with a plurality of input variables. Upon analyzing (e.g., performing a regression analysis on) the input variables of the training data and the output predictions that the machine learning model engine generates based on different sets of weighting coefficients, the computing device may generate (e.g., select) an optimal set of weighting coefficients (i.e., one weighting coefficient for each of the input variables) that in combination most accurately predict the known/correct outcome in the training data.

After training a machine learning model engine, the computing device stores the results (e.g., the weighting coefficients) generated during the Training Phase in a database (e.g., data storage system 112 in FIG. 1), thereby allowing a machine learning model analyzer (e.g., machine learning model analyzer 104 in FIG. 1) to retrieve (e.g., access, receive, etc.) the stored results at a later time, such as when assessing data drift in the machine learning model.

The now-trained, machine learning model engine may be deployed ("brought on-line") into a production environment, where the machine learning model engine may be relied on by a computing network of an organization (e.g., a financial institution, a brokerage house, a bank, etc.) to generate predictions. That is, a machine learning model engine executing on one of a plurality of machine learning model servers 106 (e.g., machine learning model servers 106a, 106b, etc.) may retrieve (e.g., obtain) scoring data from client devices 102. The machine learning model server 106 may generate an output prediction based on the scoring data, store the output prediction and the scoring data in the data storage system 112, and return the prediction to the client device 102. The client device 102 may be any computing device that consumes the output predictions generated by the machine learning model servers 106.

As will be appreciated, the techniques disclosed herein may be used in the context of any machine learning model that generates an output. For purposes of providing an example, the techniques disclosed herein may be described in the context of decisioning algorithms, e.g., decisioning algorithms that decide whether to engage in a transaction of some type, such as a financial transaction. As a more specific example, the techniques disclosed herein may be described in the context of an issuing bank deciding whether to approve a credit card transaction. In the context of a credit card transaction, the client device 102 may be an internal server system that is in communication with a point of sale device at a merchant (not shown). The point of sale device may transmit the scoring data (or, at least some of the scoring data) to the client device 102. (The scoring data may also include data that is not necessarily specific to the transaction and therefore may be received from a computing system other than the point of sale device.) The scoring data may, for example, include a transaction amount, a transaction location, data relating to other transactions conducted by the credit card customer, data relating to the merchant (e.g., type of merchant), a percentage of the customer's credit limit that has been used, and so on. The client device 102 may transmit the scoring data to one of the machine learning model servers 106, which then generates an output prediction based on the machine learning model. The output prediction may, for example, predict the likelihood that the contemplated transaction is fraudulent. The output prediction may then be returned to the client device 102, which uses the output prediction as an input in determining whether to approve the contemplated transaction. The client device 102 may use other inputs (e.g., perform other checks) in making this determination. For example, in addition to considering the likelihood the contemplated transaction is fraudulent, the client device 102 may also determine whether the contemplated transaction would cause the credit card customer (i.e., the holder of the credit card) to exceed the credit limit that has been assigned to the credit card, which would constitute an entirely separate reason to deny transaction. Based on the output prediction and other such inputs, the client device 102 determines whether to approve the transaction and returns an approval or denial message to the point of sale device.

Continuing with the credit card transaction example, the data storage system 112 may also include the system of record that the credit card issuer associated with the credit card uses to aggregate account information (e.g., including past transactions for its customers). Hence, the data storage system 112 may store the scoring data along with the output prediction that was given for all transactions. (As will be appreciated, the data storage system 112 may also store other information (e.g., related to particular transactions, related to the customer in general, and/or other information) unrelated to the input variables used during the Training Phase and the Scoring Phase of the machine learning model.) The data storage system 112 may also eventually store the actual outcome associated with the prediction and/or information that can be used to infer the actual outcome for all transactions. For example, in the context of a credit card transaction, if the credit card customer indicates via online banking or via a telephone call that a particular transaction was fraudulent, then that information may be stored in the data storage system 112. As another example, if the credit card customer receives their credit card statement, pays off some or all of the outstanding balance, and never gives any indication that the transaction was fraudulent, then it may be inferred that the transaction was not fraudulent.

As will be appreciated, therefore, data that is considered scoring data as of "today" may be used as training data at some point in the future (i.e., after the actual outcomes are known or can be inferred with reasonable accuracy). Additionally, once the actual outcomes are known, that information itself may be used to determine whether to retrain the model (i.e., because it may be determined that the model is no longer predicting actual outcomes with a sufficient degree of accuracy). In certain scenarios, however, it is desirable to assess the performance of the machine learning model before such actual outcomes are known/capable of being inferred. In other words, it may be desirable to know that the current model should be re-trained (or that the results of the current model should be discounted or even disregarded), without knowing the actual outcomes ("ground truth") compare against the predicted outcomes made by the current model. For example, consider the case of a sudden and drastic downturn in the economy, or the case of a period of sudden and drastic inflation. In the case of a sudden and drastic downturn in the economy, a model that is trained when unemployment was at 3% may become less accurate when unemployment is at 20%. In the case of sudden and drastic inflation, a model trained using training data from prior to the inflationary period might consider a transaction amount of $1000 as being more likely to be fraudulent (e.g., a fraudster purchasing expensive electronics at an electronics store). After the inflationary period, however, transaction amounts of $1000 might be relatively routine and thus not as likely to be fraudulent as compared to prior to the inflationary period.

In the credit card example, if purchases are made in Month 1, the credit card statement may be sent out at the end of Month 1, and the customer may not pay their credit card bill until the end of Month 2. Hence, a data lag of, for example, 45 days may exist. In such a scenario, the WAD score described herein may be used as an early warning indicator that the machine learning model that was trained using training data from prior to the economic downturn (e.g., or inflationary period, or other significant economic disruption) may no longer be accurate. Such information may be used to improve the operation of the machine learning model servers 106 and/or the client devices 102. For example, if the WAD score indicates a significant amount of data drift since the machine learning model was originally trained, it may be possible to retrain the model using data that is more recent (albeit potentially less reliable than the original training data at the time the original training data was used to train the model) but that takes into account more recent economic conditions. For example, if the model was originally trained with data that is 60-90 days old (to ensure the reasonableness of the inference that the lack of a customer complaint is a reliable indicator of the transaction not having been fraudulent), the model could be retrained with data that is 30 days old (which reflects more recent economic conditions, and where more recent "ground truth" is available, but where additional customer complaints about fraudulent transactions might still be received and, as such, the data is not as reliable as it would be if it were older). Alternatively, as another example, downstream systems (e.g., client devices 102) may implement a modified decisioning process to reflect the fact that significant model drift has been detected in connection with the machine learning models executing on machine learning model servers 106, and therefore the output predictions made by the machine learning model servers may need to be weighted less heavily in the decisioning process ("taken with a grain of salt") or ignored altogether (given no weight). For example, other things being equal in the scoring data, a greater percentage of transactions may be declined than prior to the economic disruption.

Thus, in some embodiments, the disclosure herein improves the operation of the computer system 100 shown in FIG. 1 in that the machine learning model analyzer 104 is now able to transmit an alert signal indicating to the client devices 102 that the machine learning model executing on the machine learning model servers 106 should be retrained, or at least, that the outputs generated by the machine learning model servers 106 should be discounted or disregarded. Further, it is possible to generate such an alert signal more quickly because it is possible to generate the alert signal without the actual outcomes of recent scoring data ("ground truth") being known. As a result, the decisions made by client devices 102 are enhanced/made more timely in view of recent conditions (e.g., recent economic conditions).

The training data and the scoring data may each be used in connection with a plurality of input variables, which may each be categorical or numeric. For example, the training data and the scoring data may include a transaction amount (e.g., $100.00), a transaction type (e.g., product or service), a commerce type (e.g., intrastate, interstate, or international), a merchant type (e.g., big box electronics retailer, grocery store, home improvement store), and so on.

In the Scoring Phase, the machine learning model analyzer 104 monitors the performance of a machine learning model engine by generating a weighted average drift (WAD) score based on the training data, scoring data, and weighting coefficients used by the machine learning model. The WAD score may be a single metric that quantifies the overall data drift (also referred to as, "variable drift", "model drift", or "concept drift") of the machine learning model engine across a plurality of input variables, as opposed to only a single input variable. That is, the WAD score may be used to indicate whether the differences between the training data (i.e., the data used to train the machine learning model engine) and the scoring data (i.e., the data that the machine learning model engine receives and analyzes after being deployed into production) are large enough to cause, or likely to cause, the machine learning model engine to make less accurate predictions.

Thus, the machine learning model analyzer 104 uses (e.g., analyzes, processes, evaluates, etc.) the WAD score to determine whether the machine learning model engine should be taken offline (e.g., removed from deployment/ production such that the machine learning model engine is inaccessible to one or more computing devices and/or networks, etc.) and/or be re-trained using a new set of training data that is more representative of the scoring data currently being seen than the training data that was used to train the machine learning model engine prior to deployment. In some arrangements, the machine learning model analyzer may display the WAD score on a computer screen (e.g., computer screen 103 in FIG. 1) associated with the machine learning model analyzer and/or send an alert to a computing device (e.g., client device 102 in FIG. 1) causing the computing device to display the WAD score on a screen (not shown in FIG. 1) associated with the computing device. In other arrangements, the WAD score may be sent to the client device 102, such that the client device 102 may dynamically reconfigure a decisioning circuit of the client device 102 to adjust the weighting given to the output predictions given by the machine learning model server 106 relative to other inputs considered by the client device 102 (e.g., to reduce the weight given to the predictions).

Referring now to FIG. 1 specifically, in detail, FIG. 1 is a block diagram depicting an example environment for quantifying the impact of concept drift on a machine learning model, according to some arrangements. The environment 100 includes one or more client devices 102, a machine learning model analyzer 104, and machine learning model servers 106a, 106b (collectively referred to herein as machine learning model servers 106) that are in communication with one another via a communication network 120. The machine learning model server 106a includes (i.e., executes on its dedicated processor) a machine learning model engine 108a and the machine learning model server 106b includes a machine learning model engine 108b (collectively referred to herein as machine learning model engines 108). In some arrangements, the machine learning model analyzer 104 includes one or more of machine learning model engines 108. The machine learning model engines 108a and 108b may instantiate different instances of the same underlying machine learning model. Of course, the servers 106 may be physical or virtual and may be executing additional machine learning models as well. The client device 102 may be any computing device that consumes the output predictions generated by the machine learning model servers 106. The client device 102 may be a device that is physically separate from the machine learning model engines 108 and/or the machine learning model analyzer 104, or the client device 102 may be a virtual device that executes on the same physical hardware as the machine learning model engines 108 and/or the machine learning model analyzer 104. The client device 102 may also be inside or outside the firewall of the entity that operates the remainder of system 100. The client devices 102, machine learning model analyzer 104, and machine learning model servers 106 each include hardware elements, such as one or more processors, logic devices, or circuits. The environment 100 includes a computer screen 103 (e.g., a monitor, a smartphone display, etc.) that is communicably coupled to the machine learning model analyzer 104 for displaying information (e.g., a WAD score).

The environment 100 includes a data storage system 112 for storing weighted average drift (WAD) scores, sets of training data, sets of scoring data (including requests sent from client devices 102), and/or model data (e.g., output predictions, weighting coefficients, etc.), and/or WAD score data. As previously indicated, the data storage system 112 may also implement the system of record in the context of a financial institution or other entity.

The training data may be used to train a machine learning model engine to generate output predictions within a particular accuracy range. For example, a machine learning model engine configured to detect fraudulent/money laundering activity may be trained using a set of training data that relates (e.g., maps, links, associates, etc.) transactions made by client devices 102 to a plurality of input variables that describe each transaction, such as a transaction amount (e.g., $100.00), a transaction type (e.g., product or service), a commerce type (e.g., intrastate, interstate, or international), a transaction location, and so on. Each set of training data also includes the ground truth (known outcomes) that maps the plurality of input variables to output labels (e.g., correct predictions).

The client device 102 is an electronic computing device (also referred to herein as simply a computing device) that is capable of receiving a request to access a resource (e.g., a blockchain, a cloud system, a financial system, a brokerage system, a credit system, a banking statement, a financial/security transaction, a loan, a credit score, etc.) provided by an organization (e.g., a financial institution, a brokerage house, a bank). To decide how to respond to the request, the client device 102 may send a request to the machine learning model server 106 to generate a prediction based on a set of scoring data. The machine learning model analyzer 104 may be used to periodically assess the performance of the machine learning model engines 108. For example, an administrator may cause the machine learning model analyzer 104 to calculate the WAD score and display the WAD score on a display 103, which the administrator may use in managing the environment 100 (e.g., determining whether to re-train machine learning model engines 108). In other embodiments, the WAD score may be generated automatically on a recurring basis and sent to the client device 102, whereby the client device 102 may be configured to discount or disregard the output prediction generated by the machine learning model engines 108 depending on the WAD score. For example, as the WAD score increases, the output predictions generated by the machine learning model engines 108 may be weighted less heavily in decision-making algorithms executed by the client device 102.

The client device 102 may further be in communication with any number of different types of electronic computing devices (not shown) adapted to communicate over a communication network, including without limitation, a personal computer, a laptop computer, a desktop computer, a mobile computer, a tablet computer, a smart phone, an application server, a catalog server, a communications server, a computing server, a database server, a file server, a game server, a mail server, a media server, a proxy server, a virtual server, a web server, or any other type and form of computing device or combinations of devices. In the example above, the client device 102 is in communication with point-of-sale devices.

The machine learning model analyzer 104 is an electronic computing device associated with an organization that is configured to retrieve model data (e.g., weighting coefficients) from a data storage system 112 and generate a weighted average drift (WAD) score based on the model data. The machine learning model analyzer 104, in some arrangements, may be configured to send an alert to a client device 102 causing the client device 102 to display information associated with the alert on a computer screen. The machine learning model analyzer 104 may be any number of different types of electronic computing devices, as discussed herein.

The communication network 120 is a local area network (LAN), a wide area network (WAN), or a combination of these or other networks, that interconnects the electronic computing devices (as discussed herein) and/or databases. The environment 100 may include many thousands of client devices 102, machine learning model analyzers 104, machine learning model servers 106, and machine learning model engines 108 interconnected in any arrangement to facilitate the exchange of data between such electronic computing devices.

Figure 2:
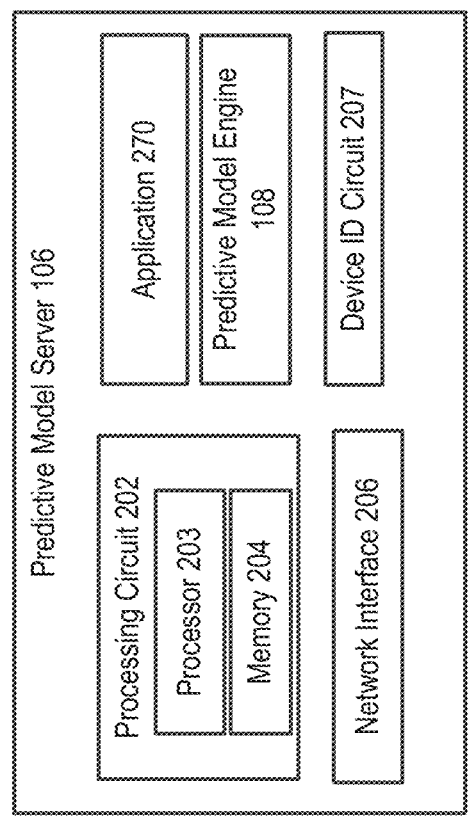
FIG. 2 is a block diagram depicting an example machine learning model server of the environment in FIG. 1, according to some arrangements.

FIG. 2 is a block diagram depicting an example machine learning model server 106 of the environment in FIG. 1, according to some arrangements. While various circuits, interfaces, and logic with particular functionality are shown, it should be understood that machine learning model server 106 includes any number of circuits, interfaces, and logic for facilitating the functions described herein. For example, the activities of multiple circuits may be combined as a single circuit and implemented on a single processing circuit (e.g., processing circuit 202), as additional circuits with additional functionality are included.

The machine learning model server 106 includes a processing circuit 202 composed of one or more processors 203 and a memory 204. A processor 203 may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 203 may be a multi-core processor or an array (e.g., one or more) of processors.

The memory 204 (e.g., Random Access Memory (RAM), Read-Only Memory (ROM), Non-volatile RAM (NVRAM), Flash Memory, hard disk storage, optical media, etc.) of processing circuit 202 stores data and/or computer instructions/code for facilitating at least some of the various processes described herein. The memory 204 includes tangible, non-transient volatile memory, or non-volatile memory. The memory 204 stores programming logic (e.g., instructions/code) that, when executed by the processor 203, controls the operations of the machine learning model server 106. In some arrangements, the processor 203 and the memory 204 form various processing circuits described with respect to the machine learning model server 106. The instructions include code from any suitable computer programming language such as, but not limited to, C, C++, C#, Java, JavaScript, VBScript, Perl, HTML, XML, Python, TCL, and Basic. In some arrangements (referred to as "headless servers"), the machine learning model server 106 may omit input/output circuits for human-machine I/O devices, but may communicate with an electronic computing device via network interface 206.

The machine learning model server 106 includes a network interface 206 configured to establish a communication session with a computing device 102 for sending and receiving data over the communication network 120 to the computing device 102. Accordingly, the network interface 206 includes a wired network interface, a local wireless network transceiver (supporting 802.11X, ZigBee, Bluetooth, Wi-Fi, or the like), a combination thereof (e.g., both a cellular transceiver and a Bluetooth transceiver), and/or the like. In some arrangements, the machine learning model server 106 includes a plurality of network interfaces 206 of different types, allowing for connections to a variety of networks, such as local area networks or wide area networks including the Internet, via different sub-networks.

The machine learning model server 106 includes a device identification circuit 207 (shown in FIG. 2B as device ID circuit 207) configured to generate and/or manage a device identifier associated with the machine learning model server 106. The device identifier may include any type and form of identification used to distinguish the machine learning model server 106 from other computing devices. In some arrangements, a device identifier may be associated with one or more other device identifiers. In some arrangements, the device identifier may be cryptographically generated, encrypted, or otherwise obfuscated by any circuit of the machine learning model server 106. In some arrangements, the machine learning model server 106 may include the device identifier in any communication that the machine learning model server 106 sends to the client device 102.

The machine learning model server 106 includes (or executes) an application 270 that is communicably coupled to the communication network 120 allowing the machine learning model server 106 to send/receive data to any other computing device connected to the communication network 120. The application 270 may be an internet/web browser, a graphical user interface (GUI), an email reader/client, a File Transfer Protocol (FTP) client, a virtual machine application, or a banking client application independent from an internet/web browser.

The machine learning model server 106 includes one or more machine learning model engines 108 (e.g., machine learning model engine 108a and machine learning model engine 108b) that execute on the machine learning model server 106. A computing device (e.g., machine learning model analyzer 104) may train a machine learning model (e.g., perform regression analysis to select an optimal set of weighting coefficients) which is then deployed on the machine learning model servers 106. When a request is received from a client device 102 to generate an output prediction, the machine learning model engine may receive scoring data from the client device 102, apply the machine learning model to the scoring data using the weighting coefficients, generate the output prediction, and return the output prediction to the client device 102. As previously indicated, in a large scale computing system, different (physical or virtual) machine learning model servers 108 may be used to execute different machine learning models used for different business purposes. For purposes of simplicity, however, it is assumed herein that all of the machine learning model servers 106 are executing the same machine learning model.

The machine learning model server 106 includes a bus (not shown), such as an address/data bus or other communication mechanism for communicating information, which interconnects circuits and/or subsystems (e.g., machine learning model engines 108, etc.) of the machine learning model server 106. In some arrangements, the machine learning model server 106 may include one or more of any such circuits and/or subsystems.

In some arrangements, some or all of the circuits of the machine learning model server 106 may be implemented with the processing circuit 202. For example, any of the machine learning model engines 108 may be implemented as a software application stored within the memory 20 and executed by the processor 203. Accordingly, such arrangement can be implemented with minimal or no additional hardware costs. In some arrangements, any of these above-recited circuits rely on dedicated hardware specifically configured for performing operations of the circuit.

Figure 3:
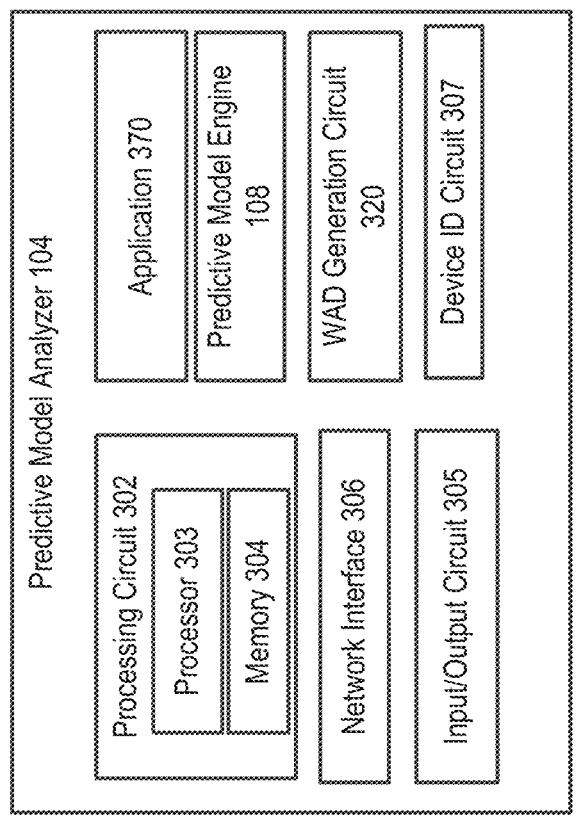
FIG. 3 is a block diagram depicting an example machine learning model analyzer of the environment in FIG. 1, according to some arrangements.

FIG. 3 is a block diagram depicting an example machine learning model analyzer 104 of the environment in FIG. 1, according to some arrangements. While various circuits, interfaces, and logic with particular functionality are shown, it should be understood that machine learning model analyzer 104 includes any number of circuits, interfaces, and logic for facilitating the functions described herein. For example, the activities of multiple circuits may be combined as a single circuit and implemented on a single processing circuit (e.g., processing circuit 302), as additional circuits with additional functionality are included.

The machine learning model analyzer 104 includes a processing circuit 302 composed of one or more processors 303 and a memory 304. The processing circuit 302 includes identical or nearly identical functionality as processing circuit 202 in FIG. 2, but with respect to circuits and/or subsystems of the machine learning model analyzer 104 instead of circuits and/or subsystems of the machine learning model server 106.

The memory 304 (e.g., Random Access Memory (RAM), Read-Only Memory (ROM), Non-volatile RAM (NVRAM), Flash Memory, hard disk storage, optical media, etc.) of processing circuit 302 stores data and/or computer instructions/code for facilitating at least some of the various processes described herein. The memory 304 includes identical or nearly identical functionality as memory 204 in FIG. 2, but with respect to circuits and/or subsystems of the machine learning model analyzer 104 instead of circuits and/or subsystems of the machine learning model server 106.

The machine learning model analyzer 104 includes a network interface 306 configured to establish a communication session with the client device 102 for sending and receiving data over the communication network 120 to the client device 102. Accordingly, the network interface 306 includes identical or nearly identical functionality as network interface 206 in FIG. 2, but with respect to circuits and/or subsystems of machine learning model analyzer 104 instead of circuits and/or subsystems of machine learning model server 106.

The machine learning model analyzer 104 includes an input/output circuit 205 configured to receive user input from and provide information to a user. In this regard, the input/output circuit 205 is structured to exchange data, communications, instructions, etc. with an input/output component of the machine learning model analyzer 104. Accordingly, input/output circuit 205 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the machine learning model analyzer 104, such as a built-in display, touch screen, microphone, etc., or external to the housing of the machine learning model analyzer 104, such as a monitor (e.g., computer screen 103 in FIG. 1) connected to the machine learning model analyzer 104, a speaker connected to the machine learning model analyzer 104, etc., according to various arrangements. In some arrangements, the input/output circuit 205 includes communication circuitry for facilitating the exchange of data, values, messages, and the like between the input/output device and the components of the machine learning model analyzer 104. In some arrangements, the input/output circuit 305 includes machine-readable media for facilitating the exchange of information between the input/output device and the components of the machine learning model analyzer 104. In still another arrangement, the input/output circuit 205 includes any combination of hardware components (e.g., a touchscreen), communication circuitry, and machine-readable media.

The machine learning model analyzer 104 includes a device identification circuit 307 (shown in FIG. 3 as device ID circuit 307) configured to generate and/or manage a device identifier associated with the machine learning model analyzer 104. The device ID circuit 307 includes identical or nearly identical functionality as device ID circuit 207 in FIG. 2, but with respect to circuits and/or subsystems of the machine learning model analyzer 104 instead of circuits and/or subsystems of the machine learning model server 106.

The machine learning model analyzer 104 includes (or executes) an application 370 (also referred to herein as, "an Artificial Intelligence (AI) platform") that the machine learning model analyzer 104 displays on a computer screen (e.g., computer screen 103 in FIG. 1) allowing a user of the machine learning model analyzer 104 to view and exchange data (e.g., an output prediction, training data, scoring data, a WAD score, resources and/or services that were requested by a client device 102, etc.) with any other computing devices (e.g., client device 102, machine learning model servers 106, etc.) connected to the communication network 120, or any circuit and/or subsystem (e.g., machine learning model engines 108, WAD generation circuit 320, etc.) of the machine learning model analyzer 104.

The machine learning model analyzer 104 includes a bus (not shown), such as an address/data bus or other communication mechanism for communicating information, which interconnects circuits and/or subsystems (e.g., machine learning model engines 108, WAD generation circuit 320, etc.) of the machine learning model analyzer 104. In some arrangements, the machine learning model analyzer 104 may include one or more of any such circuits and/or subsystems.

In some arrangements, the machine learning model analyzer 104 may include a machine learning model engine 108 executing that includes identical or nearly identical functionality as the machine learning model engine 108 in FIG. 2, but with respect to circuits and/or subsystems of the machine learning model server 106 instead of circuits and/or subsystems of the machine learning model server 106. For example, the machine learning model analyzer 104 may train a machine learning model (e.g., perform regression analysis to select an optimal set of weighting coefficients) which is then deployed on the machine learning model servers 106, and the machine learning model engines 108 may be used to test the machine learning model prior to deployment. The machine learning model engine 108 may, for example, be used by an administrator in connection with performing model testing and so on.

In some arrangements, some or all of the circuits of the machine learning model analyzer 104 may be implemented with the processing circuit 302. For example, the machine learning model engines 108 and/or the WAD generation circuit 320 may be implemented as a software application stored within the memory 304 and executed by the processor 303. Accordingly, such arrangement can be implemented with minimal or no additional hardware costs. In some arrangements, any of these above-recited circuits rely on dedicated hardware specifically configured for performing operations of the circuit.

The machine learning model analyzer 104 includes a weighted average drift (WAD) generation circuit 320. The WAD generation circuit 320 may be configured to retrieve training data, scoring data, and model data (e.g., weighting coefficients) from a database (e.g., database system 112 in FIG. 1) and, as discussed in greater detail below, generate a WAD score based on the retrieved data.

Figure 4:
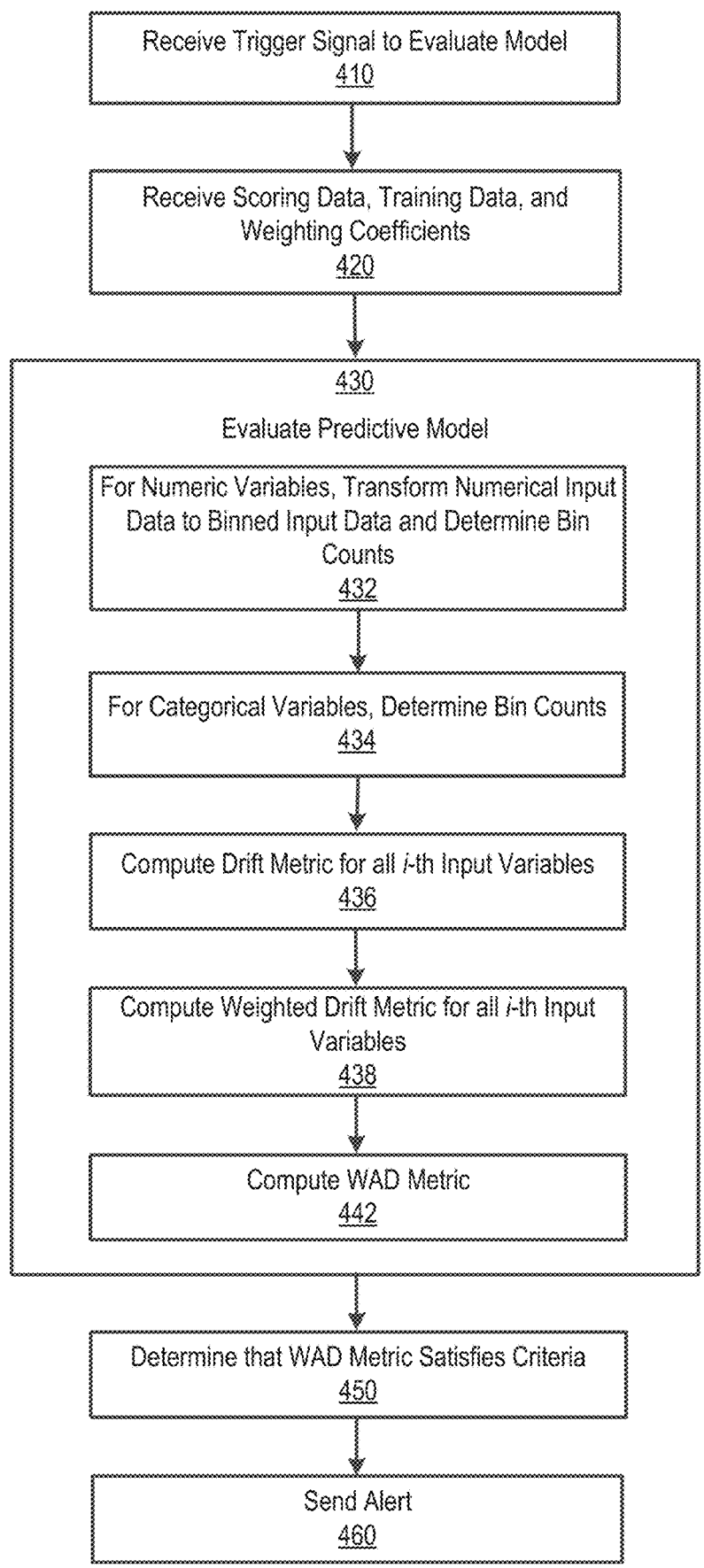
FIG. 4 is a flow diagram depicting a method for quantifying the impact of d drift on a machine learning model and generating an alert, according to some arrangements.

With reference to FIG. 4, generation of the WAD score is now described in greater detail. As previously indicated, in various embodiments, the WAD score may be used to generate an alert signal indicating to the client devices 102 that the machine learning model executing on the machine learning model servers 106 should be retrained, or at least, that the outputs generated by the machine learning model servers 106 should be discounted or disregarded. To this end, in various embodiments the machine learning model is analyzed using a goodness of fit test. A goodness of fit test usually involves examining a random sample from some unknown distribution in order to test the theoretical hypotheses that the unknown distribution is in fact a known, specified function. In a known hypothetical example, a goodness of fit test may be used to test the hypotheses that a random sample of people has been drawn from a population in which men and women are equal in frequency. In this example, the observed outcome (i.e., actual number of men and women in the tested sample) would be compared to the expected frequencies, e.g., fifty men and fifty women for a sample size of one-hundred people. If the observed outcomes were forty-five men and fifty-five women, that would yield a less favorable goodness of fit metric as compared to an observed outcome of forty-eight men and fifty-two women.

As previously indicated, the techniques disclosed herein may be used in the context of any machine learning model that generates an output, e.g., decisioning algorithms that decide whether to engage in a transaction of some type, such as a financial transaction. The previously-provided more specific example was in the context of a credit card transaction in which the machine learning model is used to decide whether to approve a credit card transaction based on a predicted outcome of the transaction being fraudulent. For simplicity, to continue with that example, the outcome may be considered to be whether the transaction turned out to be fraudulent or not fraudulent. Once this information is known, the model may be evaluated to assess how well the observed outcomes are predicted by the model.

As previously indicated, however, in some scenarios, it may be desirable to evaluate a machine learning model before the actual outcomes are observed. For example, in the credit card transaction example, a common technique is to wait for a period of time for customer complaints and, if no complaint is received within a period of time (e.g., when a payment is received in connection with a statement containing the transaction, etc.), then after that time the credit card transaction is assumed to have not been fraudulent. During times of rapid economic change (e.g., a rapid economic downturn, a period of significant inflation, etc.), however, it may be worthwhile to assess the performance of a machine learning model without using knowledge of actual outcomes, e.g., so that the assessment may be performed sooner before the knowledge of actual outcomes is available.

With the foregoing in mind, according to various embodiments described herein, a goodness of fit test is applied, however, not with regard to actual outcomes (e.g., a fraudulent transaction vs. a not fraudulent transaction). Rather, the goodness of fit test is applied to time-displaced data. Specifically, the goodness of fit test is used to assess whether the data that was originally used to train the model remains a good fit for current economic data without using any sort of comparison of predicted and actual outcomes.

Referring more specifically to FIG. 4, FIG. 4 is a flow diagram depicting a method for evaluating a machine learning model and generating an alert signal based on the result of the evaluation. Additional, fewer, or different operations may be performed in the method depending on the particular arrangement. In some arrangements, some or all operations of method 400 may be performed by one or more processors executing on one or more computing devices, systems, or servers. Each operation may be re-ordered, added, removed, or repeated.

At operation 410, the machine learning model analyzer 104 receives a trigger signal configured to cause the machine learning model analyzer 104 to evaluate a machine learning model. In some embodiments, the trigger signal may be manually generated. For example, the trigger signal may originate from a user of the machine learning model analyzer 104 via an input device (e.g., keyboard, mouse, etc.) communicating with an input/output circuit (e.g., input/output circuit 305 in FIG. 3) of the machine learning model analyzer 104. As another example, the trigger signal may be automatically generated (e.g., on a recurring basis, responsive to an alert from another computing device, etc.). For example, another computing device may recognize a higher incidence of fraud being reported, and generate a trigger signal to the machine learning model analyzer 104 to evaluate the machine learning model. As another example, a computing device may determine that a stock market indicator (e.g., Dow Jones Industrial Average) has decreased by more than a threshold percentage, and in response generate a trigger signal to the machine learning model analyzer 104 to evaluate the machine learning model. As another example, an artificial intelligence (AI) engine may monitor market conditions (e.g., stock market prices, indices, etc.), news events (e.g., using news feeds) or other information, and generate a trigger signal based on an analysis of such information.

At operation 420, responsive to receiving the trigger signal, the WAD generation circuit 320 requests and receives recent scoring data, along with the original training data and weighting coefficients. For example, such data may be retrieved from the data storage system 112, as previously indicated.

At operation 430, the WAD generation circuit evaluates the machine learning model. As previously indicated, in an example embodiment, the machine learning model is evaluated using a goodness of fit metric. Depending on the specific decisioning algorithm and the nature of the input variables involved, various goodness of fit tests may be utilized. Examples of goodness of fit tests that may be utilized include, for example, include the Bayesian information criterion, the Kolmogorov-Smirnov test, the Cramer-von Mises criterion, the Anderson-Darling test, the Shapiro-Wilk test, the chi-squared test, the Akaike information criterion, the Hosmer-Lemeshow test, Kuiper's test, Kernelized Stein discrepancy, Zhang's ZK, ZC and ZA tests, the Moran test, and so on.

For purposes of providing an example, it is assumed herein that the goodness of fit metric that is used to evaluate the machine learning model is the chi-squared metric (sometimes referred to simply as the chi-square metric). The chi-square metric $\chi^2$ is defined by the following equation:

$$\chi^2 = \sum_{j=1}^{K} \frac{(O_j - E_j)^2}{E_j} \quad \text{Eq. (1)}$$

($O_j$ and $E_j$ in this example are counts per bin/category. The index of summation (j) has an upper limit of K, which refers to the number of bins, as discussed in further detail below.

Notably, instead of being the observed outcome and the expected outcome, respectively, here $O_j$ and $E_j$ refer to the scoring data and the training data, respectively. That is, instead of being used to test a theoretical hypotheses that an unknown distribution is in fact a known, specified function (e.g., that a random sample of people will in fact have an equal frequency of men and women), here, the goodness of fit test is utilized to test the goodness of fit between two sets of data, i.e., the training data (obtained during a first, earlier time period) and scoring data (obtained during a second, more recent time period). Neither the training data nor the scoring data that is being considered as part of the goodness of fit test is an observed "outcome," i.e., an outcome that the model is attempting predict. Instead, both the training data and the scoring data that are being compared for goodness of fit operate as input data to the machine learning model. The difference in the training data and the scoring data is that they pertain to two different periods of time. For example, the training data and the scoring data may pertain to two different periods of time because they pertain to transactions that were conducted during those two different periods of time. Therefore, the goodness of fit metric may instead be considered to be a drift metric, i.e., a measure of how changes in the distribution of input data over time leads to model performance degradation, i.e., because the scoring data that is currently being received no longer has the same distribution as the training data that was used to create the machine learning model (including, particularly, the selection of the weighting coefficients). Here, the lack of a goodness of fit is not due to faultiness of the null hypotheses, but rather is a result of changes in time, e.g., due to a rapid change of economic conditions.

To facilitate discussion, rather than $O_j$ and $E_j$, the parameters $S_j$ and $T_j$ will be used henceforth to refer to the scoring data and the training data, respectively. As previously indicated, $O_j$ and $E_j$ typically refer to observed and expected outcomes, whereas what is being compared herein is input data, not outcomes. With the foregoing change in nomenclature in mind, therefore, Eq. (1) may be rewritten as follows:

$$\chi^2 = \sum_{j=1}^{K} \frac{(S_j - T_j)^2}{T_j} \quad \text{Eq. (2)}$$

As a hypothetical proposition, if $S_j=T_j$ for all j (i.e., no drift has occurred), such that $(S_j-T_j)^2=0$ for all j, then $\chi^2=0$. In other words, more generally, a smaller $\chi^2$ value is associated with a relatively smaller amount of drift, whereas a larger $\chi^2$ value is associated with a relatively larger amount of drift.

Continuing by way of example with the previous example, in one embodiment, the chi-square metric is applied as an input to the Cramer's V metric. The Cramer's V metric is defined by the following equation:

$$V = \sqrt{\frac{\chi^2}{N \times v}} \quad \text{Eq. (3)}$$

Where $\chi^2$ is the chi-square metric, N is the sample size, and v is the degrees of freedom. In general, v=K−1, where K is the number of bins for the variable. (Cramer's V is an effect size metric, meaning that it reflects the magnitude of the difference between the two distributions regardless of sample size. This avoids concern regarding large sample sizes causing minor differences to appear statistically significant, which may occur when performing conventional hypothesis testing.)

As will be appreciated, alternatives exist to the Cramer's V/metric. As an example, an alternative metric which related to the Cramer's V metric, and which is sometimes referred to the Cramer's W metric, is defined by the following equation:

$$W = \sqrt{\frac{\chi^2}{N^2}}$$ Eq. (3a)

An advantage of the Cramer's W metric is that it is even less sensitive to sample sizes. As will be appreciated, other (entirely unrelated to Cramer's V) metrics may also be used. For purposes of providing an example, it is assumed herein that the Cramer's V metric is utilized.

The Cramer's V metric is a measure of the similarity or difference between two sets of categorical data. Again, as a hypothetical proposition, if $\chi^2$=0, then the Cramer's V metric is also equal to zero (V=0). Hence, a smaller Cramer's V value indicates that the datasets are relatively similar, while a larger Cramer's V value indicates that the datasets are relatively different. As applied to drift, a smaller Cramer's V metric is associated with a relatively smaller amount of drift, whereas a larger Cramer's V metric is associated with a relatively larger amount of drift.

The Cramer's V metric is generally used in connection with categorical data (that is, data consisting of categories, such as "intrastate commerce," "interstate commerce," or "international commerce" for different types of transactions based on the respective locations of the customer and the merchant). In this example, the number of bins ("intrastate commerce," "interstate commerce," or "international commerce") for the variable is equal to three (K=3), and the degrees of freedom is equal to two (v=2). (If the only possibility is "intrastate commerce," then the degree of freedom is zero (v=0). Each additional possibility after that adds one degree of freedom.)

For example, continuing with the above example, ("intrastate commerce," "interstate commerce," or "international commerce"), and assuming 100,000,000 transactions as an example, the training data and the scoring data may comprise the following:

TABLE 1

|  | Bin 1 (j = 1) (Intrastate Commerce) | Bin 2 (j = 2) (Interstate Commerce) | Bin 3 (j = 3) (International Commerce) |
|---|---|---|---|
| Training Data ($T_j$) | 80,000,000 | 15,000,000 | 5,000,000 |
| Scoring Data ($S_j$) | 75,000,000 | 17,500,000 | 7,500,000 |

(Round numbers are utilized for purposes of providing a simplified example.) In this example, the chi-square metric may be calculated as follows:

$$\chi^2 = \frac{(75,000,000 - 80,000,000)^2}{80,000,000} +$$ Eq. (4a)

$$\frac{(17,500,000 - 15,000,000)^2}{15,000,000} + \frac{(7,500,000 - 5,000,000)^2}{5,000,000}$$

$$\chi^2 = 312,500 + 416,666 + 1,250,000$$ Eq. (4b)

$$\chi^2 = 1,979,166$$ Eq. (4c)

In this example, further, the Cramers V metric may be calculated as follows:

$$V = \sqrt{\frac{1,979,166}{100,000,000 \times 2}}$$ Eq. (4d)

$$V = 0.0994$$ Eq. (4e)

As will be appreciated, in the context of a decisioning algorithm (e.g., for a credit card transaction), the machine learning model may take many input variables as input. However, the chi-square metric and the Cramer's V metric are both univariate metrics. To address this issue, in various example embodiments herein, the chi-square metric and the Cramer's V metric are both calculated for each of the input variables used in the decisioning algorithm. Hence, hypothetically, if the machine learning model employs twenty-five input variables, then the chi-square metric and the Cramer's V metric are both calculated for each of the twenty-five input variables. For a given (i-th) one of the input variables. Eq. (2) may be rewritten as follows:

$$\chi_i^2 = \sum_{j=1}^{K_i} \frac{(S_{i,j} - T_{i,j})^2}{T_{i,j}}$$

where $S_{i,j}$ and $T_{i,j}$ are the scoring data and the training data for the i-th input variable and $K_i$ is the number of bins for the i-th input variable. If there are twenty-five input variables, then i varies in the range from one to twenty-five. Given that the difference of each $S_{i,j}$ and $T_{i,j}$ is being squared, Eq. (5) is the same as the following equation:

$$\chi_i^2 = \sum_{j=1}^{K_i} \frac{(T_{i,j} - s_{i,j})^2}{T_{i,j}} \qquad \text{Eq. (5a)}$$

The Cramer's Metric $V_i$ for each i-th input variable is defined by the following equation:

$$V_i = \sqrt{\frac{\chi_i^2}{N_i \times v_i}} \qquad \text{Eq. (6)}$$

Where $\chi_i^2$ is the chi-square metric for the i-th input variable, $N_i$ is the sample size for the i-th input variable, $v_i$ is the degrees of freedom for the i-th input variable. In general, again, $v_i = K_i - 1$, where $K_i$ is the number of bins for the i-th variable.

By way of providing a numeric example, hypothetically, consider again a situation in which the machine learning model will be evaluated based on 100 Million transactions of recent scoring data and 100 Million transactions of earlier training data. For each of the foregoing transactions, the scoring data and training data both consist of 25 input variables, according to a previous example. Given that the Cramer's V metric is a measure of the similarity or difference between two sets of categorical data, and given that $S_{i,j}$ and $T_{i,j}$ (based on $O_j$ and $E_j$) are counts per bin, an initial step is to determine the bin counts for each defined bin for each input variable. How the bin count is determined may depend on the type of input variable. For example, for some input variables, the scoring data received from the client device 102 may include flags designating the input data as falling in one category or another. For other input variables, the category that the input data falls into may need to be derived or determined in some other manner. Continuing with the example of 25 input variables, each data value for a given transaction is determined (e.g., based on a flag that has been set, or in another manner) to be in one of the defined bins for that respective input variable. This is performed for all 25 data values/input variables associated with a particular transaction. That process may then be repeated for all 100 Million transactions for each of the scoring data and the training data in order to develop values for $S_{i,j}$ and $T_{i,j}$ for all 25 input variables. In this example process, it may be noted that the sample size N may be the same for all input variables. That is, the process is carried out with respect to all 100 Million training data transactions and all 100 Million scoring data transactions, and all of the input data for all of the variables for each transaction are considered by the machine learning model. Hence, in this example, $N_i = N = 100,000,000$ for both the scoring data and the training data (i.e., the sample size is the same (100,000,000) for all i-th input variables for both the scoring data and the training data), and Eq. (6) may be simplified as follows:

$$V_i = \sqrt{\frac{\chi_i^2}{N \times v_i}} \qquad \text{Eq. (7)}$$

The foregoing processing of data is described by way of example based on the Cramer's V metric, which is a measure of the similarity or difference between two sets of categorical data. More specifically, typically, the Cramer's V metric is typically used in connection with categorical data (i.e., as opposed to numeric data), and it is typically used in connection with two sets of categorical data (i.e., it is used for univariate analysis-comparing one data set against another, for the same input variable; as opposed to multivariate analysis—e.g., comparing one data set against another, for each of twenty-five different input variables, i.e., fifty data sets of categorical data in twenty-five different dimensions).

As will be appreciated, in various embodiments, the output predictions generated by the machine learning model engines 108 are generated based on not only categorical data (e.g., intrastate commerce vs. interstate commerce vs. international commerce), but also based on numeric data (e.g., transaction amounts, distance between customer and merchant, % credit limit utilized, and so on), whereas the Cramer's V metric is a measure of the similarity or difference between two sets of categorical data. To address this issue, the WAD generation circuit 320 may convert numeric datasets into categorical datasets or, more precisely, binned datasets. For example, a plurality of non-overlapping bins may be defined, and each of the numeric data values may be assigned to one of the bins. By way of example, for a transaction amount (e.g., Purchase Price (P)), hypothetical categories (i.e., bins) may be defined as follows:

Bin 1=P<$P_1$,

Bin 2=$P_1 \leq$P<$P_2$,

Bin 3=$P_2 \leq$P<$P_3$,

Bin 4=$P_3 \leq$P<$P_4$

\*\*\*

Bin N=$P_{n-1} \leq$P<$P_n$ \qquad Eq. (8)

where $P_1 \ldots P_n$ are successively increasing values. In the example of Eq. (8), the bin definitions define a continuous range (any numeric value between P and $P_n$ is located in one of the defined bins) and the bins are non-overlapping (given that each successive bin includes a Pn value from the previous bin, and due to the use of the "<" and "≤" operators as shown). All observations may then be placed into one of the defined bins. The WAD generation circuit 320 may then treat each bin as a category for purposes of calculating the Cramer's V value. After all of the observations are placed into one of the defined bins, the bin count for each bin may be determined, for example, in a preferred embodiment, by tallying the number of observations located in that bin. Although P relates to purchase price in the above example, P could relate to other numeric parameters in other examples.

As will be appreciated, the number of bins, the bin ranges, etc., may vary depending on the nature of input variable and the range of data that is expected to be seen. For example, if the numeric input variable relates to the purchase price of a home rather than a purchase price at a point of sale, the bin ranges would likely be completely different. As a further example, if a numeric input variable is defined as the distance between the purchaser's place of residence and the location of the merchant where the purchase is being made, that numeric input variable would have a completely different set of bins defined than the examples described above (different value ranges, different units, etc.). In some embodiments, the bin ranges for each numeric variable are determined manually. In other embodiments, an optimization process (e.g., regression analysis) may be performed to select the number of bins and the bin ranges that produce the best outcomes in terms of generating a Cramer's V value that, when combined with the other Cramer's V values (also generated based on optimized bin numbers and bin ranges), generates a WAD score that is highly tuned to the amount of data drift that has occurred. It may be noted that the bin definitions may be developed as part of creating the machine learning model (e.g., along with such steps as determining what input variables feed into the machine learning model, determining the weighting coefficients for the input variables, etc.). Hence, when it comes time to evaluate whether the machine learning model needs to be retrained, the bin definitions may be retrieved from the data storage system 112. In other embodiments, the bin definitions may be developed after the machine learning model has been deployed.

From the foregoing, as will be appreciated, the data sets for numeric input variables are placed into bins, or transformed into "binned" data sets, in order to make it possible to calculate, for those variables, drift metrics which require data that falls into a finite number of bins, or which correspond to a finite number of levels, as with categorical variables. Cramer's V and Cramer's W are examples of such drift metrics, albeit not necessarily the only such drift metrics. As will therefore also be appreciated, one of the problems addressed by the above-described solution is the problem of how to compute a weighted average drift metric across both categorical and numeric variables. The challenge is that drift metrics are compatible with either numeric variables (which have continuous ranges of values for which arithmetic operations such as addition, subtraction, multiplication and division are applicable) or categorial or ordinal variables (which have discrete numbers of levels for which bin counts can be calculated). In order to "bridge the gap", this above-described approach places the numeric data into a finite number of bins, so that bin counts can be calculated for the numeric variables, and thus drift metrics like Cramer's V and Cramer's W can be used.

Based on the foregoing, a goodness of fit metric may be developed for each of the input variables. For example, in continuing the ongoing example, a Cramer's V metric may be calculated for each of the twenty-five input variables, with each goodness of fit metric providing an indication of how good the fit is between the 100 million data points from the scoring data and the 100 million data points from the training data for the i-th input variable.

However, calculating a plurality of goodness of fit metrics for a machine learning model in some instances fails to provide a meaningful indication as to whether the machine learning model should be re-trained. For example, if there are twenty-five input variables, the goodness of fit metrics may have a range of values, all different from each other, with metrics for some input variables indicating a relatively favorable goodness of fit, and metrics for other input variables indicating a relatively poor goodness of fit, and metrics for yet further input variables falling somewhere in between. Furthermore, this issue becomes more pronounced as the number of input variables increases. For example, if the machine learning model utilizes a larger number of inputs (e.g., one-hundred input variables instead of twenty-five), it may be difficult to make sense of how to interpret one-hundred different goodness of fit metrics.

In an example embodiment, a WAD score is calculated that provides an overall drift metric for all of the input variables, i.e., a score that provides an overall goodness of fit metric for the scoring data for each of the input variables versus the training data for each of the input variables. In an example embodiment, a weighted drift $WD_i$ metric for each i-th input variable is calculated as follows:

$$WD_i = w_i \times V_i \qquad \text{Eq. (9)}$$

The weighted average drift ("WAD") score may then be calculated as the average of all of the individual weighted drift scores:

$$WAD = \frac{\sum_i w_i \times V_i}{\sum_i w_i} = \frac{\sum_i WD_i}{\sum_i w_i} \qquad \text{Eq. (10)}$$

where $w_i$ is the feature importance (i.e., weighting coefficient for the i-th input variable), $V_i$ is the Cramer's V metric for the i-th input variable, and $WD_i$ is the weighted drift for the i-th input variable (i.e., $WD_i = w_i \times V_i$ as in Eq. (9). As previously noted, as applied to drift, a smaller Cramer's V metric is associated with a relatively smaller amount of drift, whereas a larger Cramer's V metric is associated with a relatively larger amount of drift. From Eq. (10), it therefore follows that a smaller WAD score is associated with a relatively smaller amount of weighted average drift (i.e., the scoring data that currently being seen is relatively similar to the training data that was used to train the machine learning model), whereas a larger WAD score is associated with a relatively larger amount of weighted average drift (i.e., the scoring data that is currently being seen exhibits relatively more drift as compared to the training data that was used to train the machine learning model). As previously indicated, the weighted average drift (WAD) may be computed over drift metrics other than Cramer's V. An advantage of Cramer's V as compared to some other drift metrics is that it may be used to measure drift both for categorical variables and for numeric variables that have been binned to obtain a finite set of levels.

With the foregoing Eqs. (1)-(10) in mind, and referring again to operation 430, operation 430 may comprise the following sub-operations 432-438 (which may be combined and/or performed in a different order). At operation 432, input data (both scoring data and training data) for numeric variables is converted to binned data and the bin counts for each of the bins is determined. In example embodiments, operation 432 may be performed in accordance with Eq. (8) and accompanying discussion. At operation 434, input data (both scoring data and training data) for remaining categorical variables is assigned to bins. In example embodiments, operation 434 may be performed in accordance with Eqs. (5)-(7) and accompanying discussion (including particularly the numeric example that was provided). At operation 436, a drift fit metric is computed for all i-th input variables. In example embodiments, operation 436 may be performed in accordance with Eq. (5) and Eq. (7) and accompanying discussion. At operation 438, a weighted drift fit metric is computed for all i-th input variables. In example embodiments, operation 438 may be performed in accordance with Eq. (9) and accompanying discussion. At operation 442, an overall weighted average drift metric is computed for all input variables. In example embodiments, operation 442 may be performed in accordance with Eq. (10) and accompanying discussion. While certain equations and discussion is provided above, as previously indicated, the weighted average drift metric (WAD score) may also be determined using tests other than the chi square test and the Cramer's V metric.

At operation 450, the WAD generation circuit 320 may determine whether the WAD score satisfies a criterion for generating an alert. For example, the WAD generation circuit 320 may compare the WAD score with a predetermined threshold and generate the alert if the WAD score has crossed the threshold. In some arrangements, the WAD generation circuit 320 may use a rules engine consisting of a plurality of rules for automatically making this determination.

At operation 460, assuming the WAD score satisfied the criterion in operation 450, an alert is sent regarding the overall weighted average drift metric. In some embodiments, the alert may be sent to the client devices 102 to trigger the client devices 102 to discount or disregard the outputs generated by the machine learning model servers 106. In some embodiments, the alert signal may trigger the machine learning model server 106 to retrain the machine learning model engine 108, using a second (e.g., newer) set of training data that is different than the training data previously used to train the machine learning model engine 108. In some arrangements, the alert may cause the machine learning model server 106 to deny requests from a computing device (e.g., a client device 102) for an output prediction that would otherwise be generated by the machine learning model engine 108. In this manner, the alert may cause the machine learning model engine 108 to be removed from a production environment (i.e., so it is no longer "deployed," provides responses devoid of predictions, etc.). In some arrangements, the WAD generation circuit 320 may send an alert to a computing device (e.g., a client device 102) to trigger the computing device to display the WAD score on a screen associated with the computing device. In other arrangements, the WAD generation circuit 320 may present the weighted average drift score on a display (e.g., computer screen 103) associated with the machine learning model analyzer 104. Various other examples of such alerts have previously been provided.

Figure 5:
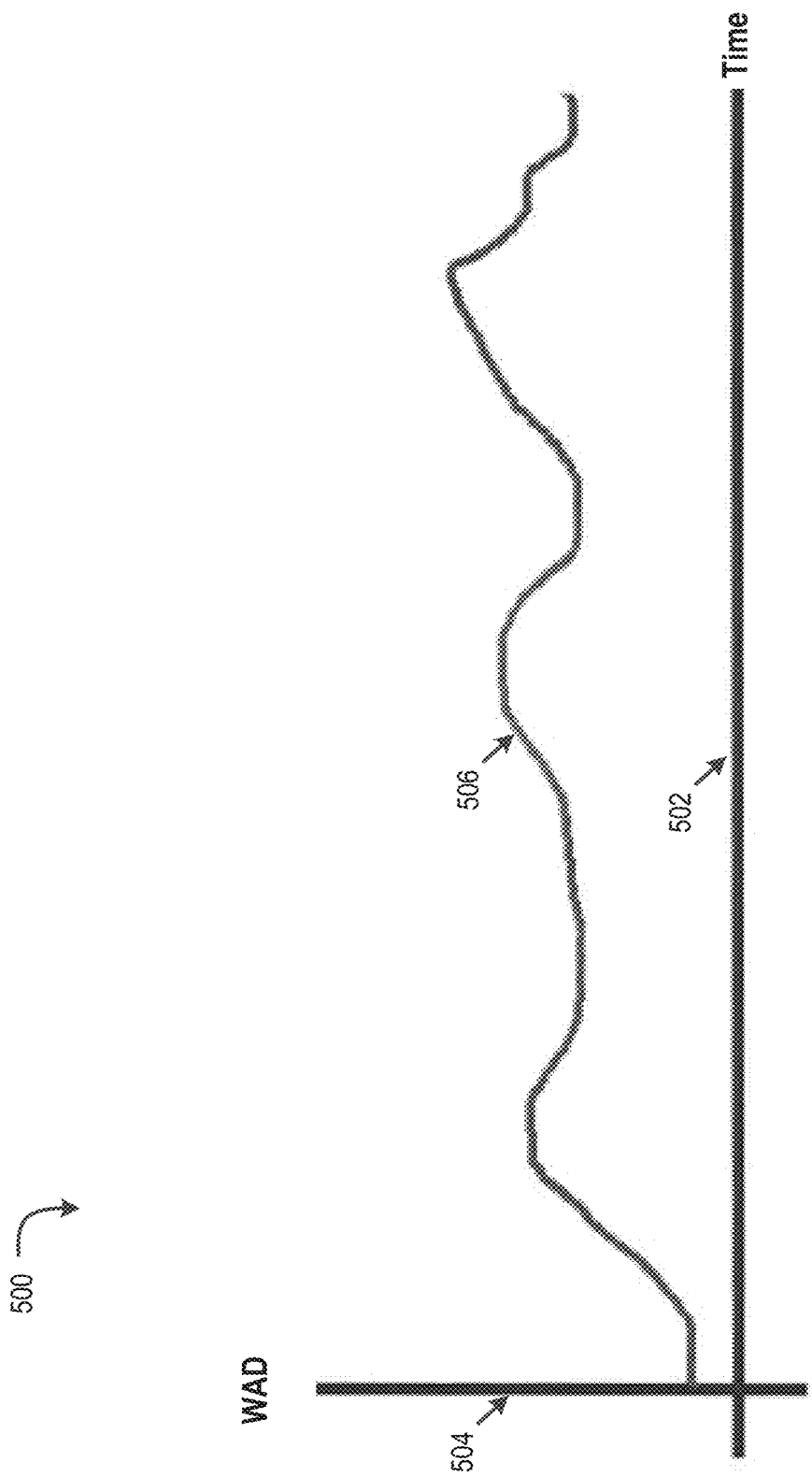
FIG. 5 is a curve showing weighted average drift as a function of time for a machine learning model, according to some arrangements.
Figure 6:
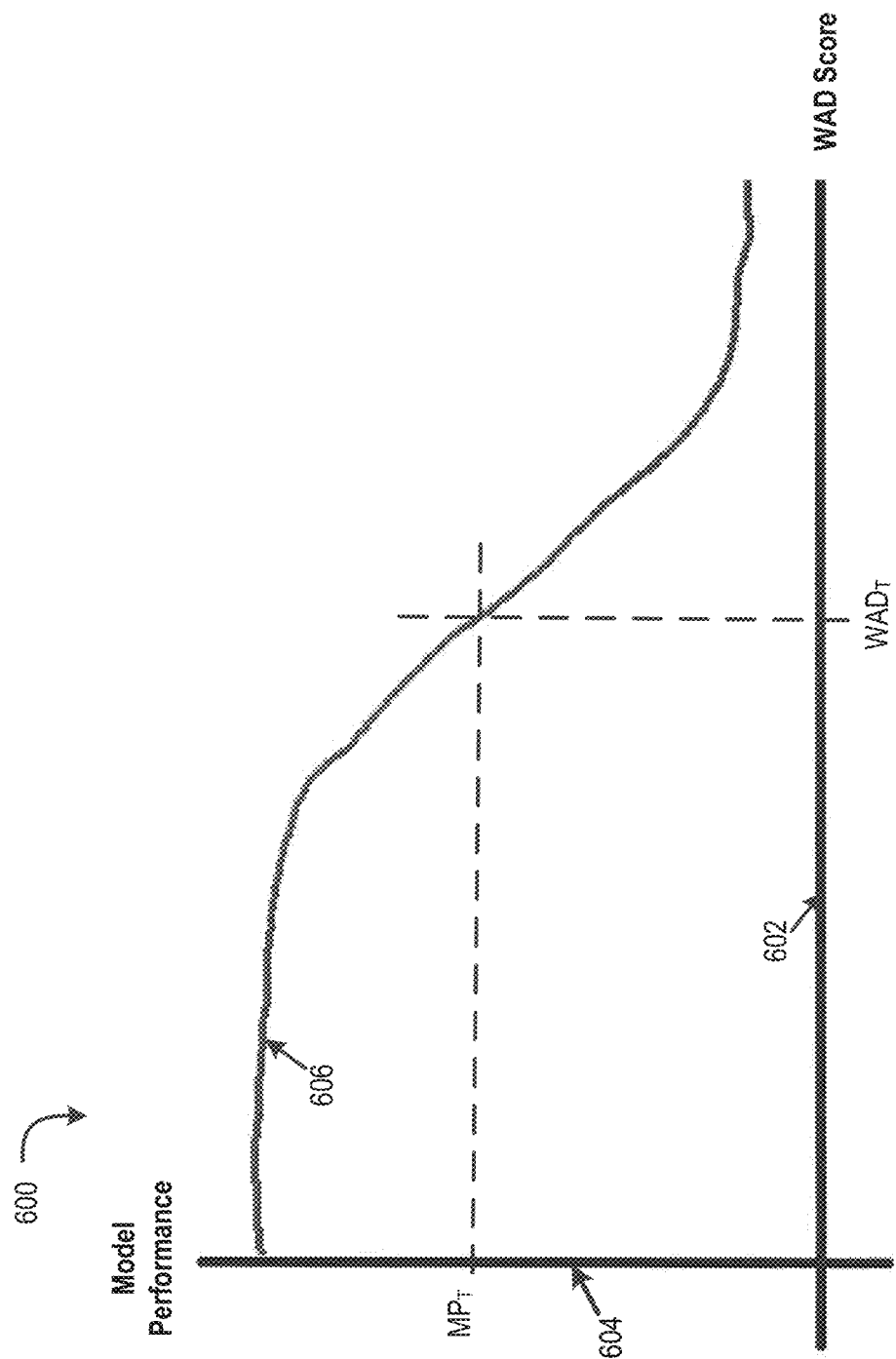
FIG. 6 is a curve showing a hypothetical model performance as a function of weighted average drift, according to some arrangements.
Figure 7:
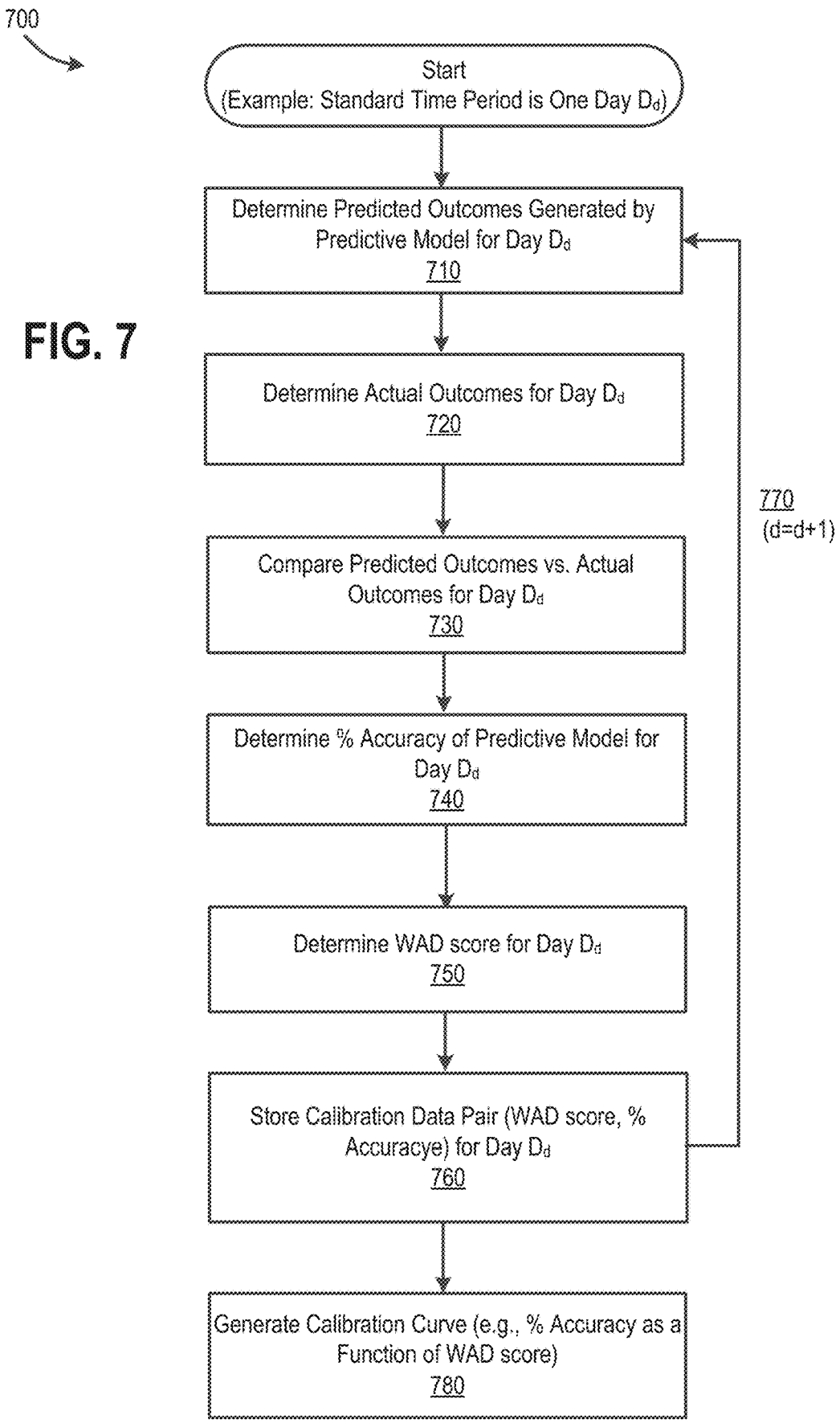
FIG. 7 is a flow diagram depicting a method for generating a calibration curve that relates a WAD score to an estimated model performance, according to some arrangements.

Referring now to FIGS. 5-7, FIGS. 5-7 depict a process for calibrating model performance (e.g. accuracy) degradation as a function of an overall drift metric (e.g., weighted average drift, as described above, or any other type of drift metric). (For purposes of providing an example, and for continuity of examples, it will be assumed henceforth that the calibration process of FIGS. 5-7 is performed and utilized in connection with the weighted average drift metric described above.) As previously indicated, in some embodiments, the WAD score is compared against a predetermined threshold to determine whether an alert should be sent. The calibration performed in FIGS. 5-7 may be used to determine the predetermined threshold that is to be used for such a comparison.

As previously described, the WAD score provides an early warning that a machine learning model may be in need of re-training (or that the output of the machine learning model may need to be discounted or disregarded), and such early warning is provided even without the benefit of the actual outcomes of the predictions that were made. Hence, the WAD score may provide a leading indicator of model performance before the actual outcomes are known, whereas the actual outcomes provide a lagging indicator of model performance.

Figure 8:
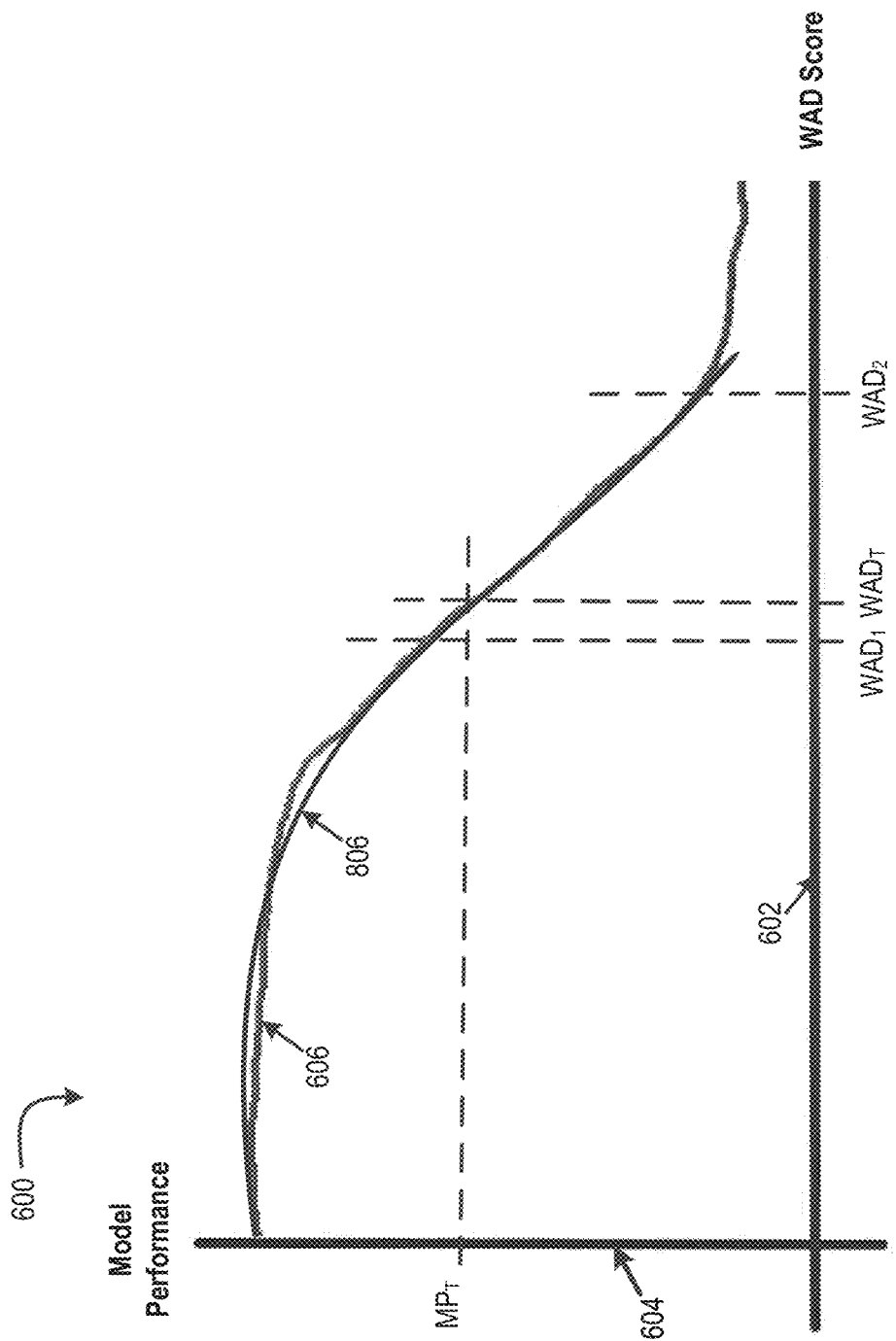
FIG. 8 is another curve showing a hypothetical model performance as a function of weighted average drift, as in FIG. 6, with additional parameters highlighted, according to some arrangements.

In embodiments herein, the calibration performed in FIGS. 5-7 may be used to connect the leading indicator of weighted average drift with the lagging indicator of model performance based on actual outcomes to provide an indication of model performance. Through the analysis described in FIGS. 5-7, the historical relationship between a drift metric (e.g., WAD score) and model performance may be shown. The additional analysis of FIG. 8 provides additional decision logic for how to decide whether to trigger an alert (e.g., additional details regarding how step 450 in FIG. 4 may be performed). As another example, the information developed in FIGS. 5-7 may be presented in a dashboard/online application to help users make decisions.

With reference first to FIG. 5, FIG. 5 is a graph depicting an example weighted average drift over time for an example machine learning model of the environment in FIG. 1, according to some arrangements. The x-axis 502 of graph 500 corresponds to time and the y-axis 504 of graph 500 corresponds to a weighted average drift (WAD) score of a machine learning model. The graph 500 includes curve 506 representing the changes in the WAD score. As indicated, the WAD score may be a parameter that varies as a function of time and, as also shown in FIG. 5, the WAD score may fluctuate both upwardly and downwardly as time progresses. For example, an initial sudden drop in stock market prices may result in a higher WAD score, and then the WAD score may fluctuate as stock market prices fluctuate. As a general proposition, though, the WAD score, as a measure of drift, is likely to increase overall as time progresses. The unit of time that is used in FIG. 5 may depend on the application. For example, if the machine learning model is being used to predict fraud in the context of a credit transaction, the time scale of the x-axis may have a unit of days. In other examples, the time scale may be another unit of time (e.g., seconds, minutes, hours, weeks, months, fractions thereof, etc.).

Referring now also to FIG. 6, FIG. 6 is a graph 600 that plots model performance (i.e., ability of the model to correctly predict outcomes) as a function of WAD score. The x-axis 602 of graph 600 corresponds to WAD score and the y-axis 604 of graph 600 corresponds to accuracy of a machine learning model. The graph 600 includes curve 606 representing the changes in accuracy of the machine learning model as a function of WAD score. Herein, the term "accuracy" is used generically to refer any metric that reflects the ability of the model to correctly predict outcomes. Hence, one example of accuracy is the ratio of correct predictions to total predictions. Other examples of accuracy may be focused on other parameters (e.g., % false positives, % false negatives, etc.). For example, accuracy may be calculated based on the number of times fraud was predicted (denominator), and in those cases where fraud was predicted, the number of times fraud actually occurred (numerator). A low percentage of false positives would thus reflect that the model is accurate in situations where fraud is predicted as the outcome. Herein, for purposes of an example, it is assumed that accuracy is calculated as the ratio of correct predictions to total predictions.

As will be appreciated, curve 606 is entirely hypothetical and would vary depending based on the nature of the machine learning model (e.g., based on input variables utilized, weighting coefficients utilized, and so on). However, as a general proposition, curve 606 shows a number of characteristics that would be expected in any plot of accuracy of a machine learning model as a function of WAD score. As previously noted, a smaller WAD score is associated with a relatively smaller amount of weighted average drift (i.e., the scoring data that is currently being seen is relatively similar to the training data that was used to train the machine learning model), whereas a larger WAD score is associated with a relatively larger amount of weighted average drift (i.e., the scoring data that is currently being seen exhibits relatively more drift as compared to the training data that was used to train the machine learning model). Hence, as shown in FIG. 6, the accuracy of the model decreases as the WAD score increases (i.e., as the scoring data that is currently being seen becomes relatively more different from the training data that was used to train the machine learning model). As an aside, even with a WAD score of zero, the model is not 100% accurate. This is simply a reflection of the fact that the machine learning model, even when initially trained, is unlikely to be accurate 100% of the time.

Curve 606 may be utilized in various ways. In some embodiments, a graph 600 (including curve 606) may be displayed to a data scientist to enable visualization of the relationship between WAD and accuracy in near-real-time. The then-current WAD score and/or recent history of WAD scores may also be displayed such that the data scientist may see how well the machine learning model is currently performing in correctly predicting outcomes. As another example, the historical drift metric and accuracy relationships can be fed into a system for automated review. For example, as depicted in FIG. 6, a threshold $WAD_T$ may be defined and used to trigger alerts when the drift metric crosses the threshold (i.e., in this example, when the WAD score exceeds the threshold). While a single threshold is shown in FIG. 6, as will be appreciated, multiple thresholds may be used to generate different alerts based on different levels of model performance, each of which elicits different responses in the computing devices that receive the responses. For example, the different alerts may indicate that the machine learning model is currently estimated to be predicting outcomes with $MP_1$% accuracy (corresponding to a first WAD threshold score $WAD_{T1}$), $MP_2$% accuracy (corresponding to a second WAD threshold score $WAD_{T2}$), $MP_3$% accuracy (corresponding to a third WAD threshold score $WAD_{T3}$), and so on (i.e., where $MP_1 > MP_2 > MP_3$ and so on). Hence, different client devices 102 that are implementing different decisioning algorithms may be apprised of the current estimated level of accuracy of the machine learning model, and utilize that information in different ways. As another example, the machine learning model server 106 may use the curve 606 to send out a current estimated level of accuracy on a periodic basis to client devices 102 and/or in connection with every predicted outcome that is sent to a client device 102.

Referring now also to FIG. 7, FIG. 7 is a flowchart depicting a process 700 for generating a curve such as curve 606 shown in FIG. 6. Continuing with previous examples, FIG. 7 is described in the context of a machine learning model used to predict the likelihood that the contemplated credit card transaction is fraudulent. At a high level, in FIG. 7, data is collected over time regarding WAD scores at a given period in time $T_c$ (leading indicator) and, subsequently, how accurate the model predictions turned out to be at that given period in time (pertaining to time $T_c$, but determined at a later period in time $T_{c+x}$) (where c is an index referring to the period of time, and x simply indicates the "later" aspect) (lagging indicator). In various embodiments, period of time $T_c$ may pertain to a point in time (e.g., a period of time of infinitesimally short duration) or to a window of time. For purposes of providing an example, in the context of credit card transactions, the period of time $T_c$ may for example be a date or, as another example, a period of time that spans two days but that is still a 24-hr period of time. For example, time $T_1$ may pertain to all predictions generated on Day 1, time $T_2$ may pertain to all predictions made on Day 2, and so on. For purposes of the example of FIG. 7, for the given simplifying assumption that the period of time is one day (e.g., Day 1, Day 2, etc.), then instead of referring to time $T_c$, reference is now instead made to day $D_d$, where d is an index referring to the day (e.g., $D_1$=Day 1, $D_2$=Day 2, and so on).

These data point pairs (WAD score, % Accuracy) may be collected for each day Da over an extended period of time (e.g., days, weeks, months, years, etc.). (That said, while it may be possible to use data extending for years, in some embodiments, it may be desirable to have a date cutoff (e.g., only the most recent 60 or 90 days is used) or to weight older data less, such that the generation of the curve is more heavily influenced by more recently collected data.) Based on the collected data points, a curve fitting operation may be performed to generate the curve that best fits the data points (WAD score, % Accuracy) collected over a period of time, as described above. As another example, every prediction that is generated may have an associated WAD score, and the curve fitting may be performed with respect to individual predictions and WAD scores. For purposes of providing an example, it is assumed in the description below that the WAD score may not change significantly from one prediction to the next, and therefore collecting data for a 24 hr period and then computing the WAD score for the 24 hr period may be sufficient and computationally less intensive. For example, if data is collected for tens of millions of credit card transactions on a given day $D_d$, it may be computationally less intensive to compute the WAD score on a day-by-day basis rather than on a transaction-by-transaction basis without significant loss in accuracy. Also, for purposes of providing an example, it also assumed that a simple date cut-off is used. In other embodiments, the WAD score may be computed on a transaction-by-transaction basis and/or a more elaborate weighting mechanism may be used for reducing the impact of older data.

Referring more specifically to FIG. 7, at operation 710, the predicted outcomes generated by the machine learning model for day Da are determined (e.g., by retrieving the predicted outcomes from the data storage system 112). At operation 720, actual outcomes for day Da are determined (e.g., by retrieving the actual outcomes from the data storage system 112). For example, as previously described, in the context of a credit card transaction, if the credit card customer indicates via online banking or via a telephone call that a particular transaction was fraudulent, then that information may be stored in the data storage system 112. As another example, if the credit card customer receives their credit card statement, pays off some or all of the outstanding balance, and never gives any indication that the transaction was fraudulent, then it may be inferred that the transaction was not fraudulent. Such information may be stored in the data storage system 112.

At operation 730, the predicted outcomes are compared against the actual outcomes for day $D_d$. For example, for day Da, the predicted outcomes may be compared against the actual outcomes to determine the number of predictions that were correct. At operation 740, the percentage accuracy of the predicted model for day Da is determined. For example, the outcome predictions that were made by the machine learning model engines 108 for day Da may be compared against all of the actual outcomes for day Da to determine what percentage of the outcome predictions turned out to be correct.

At operation 750, the WAD score for day Da is determined. For example, in a production environment, after the close of a given time period, the WAD score that is computed in operation 430 may be used to decide whether to generate an alert (operation 450) and then may be also be stored in data storage system 112. At a later time period, day $D_{d+x}$, after the actual outcomes are known, the WAD score may then be retrieved from the data storage system 112 at operation 750. In other embodiments, the WAD score may be recalculated in the same manner as described in connection with operation 430 when process 700 is performed.

At operation 760, the calibration data pair (the WAD score for day Da, % accuracy for day Da) is stored. For example, the WAD score for day Da may be stored along with the accuracy of the predictions made by the machine learning model for day Da may be stored as a data pair.

Operation 770 reflects that operations 710-760 may be repeated for each period of time (e.g., each day). When the machine learning model is first put into production, there may not be enough calibration data to generate a calibration curve. However, after enough data has been collected, at operation 780, a calibration curve is generated. For example, in some embodiments the curve may be generated by plotting the data points stored in operation 760 on a graph and connecting the plotted data points (e.g., resulting in a plot matching curve 606 in FIG. 6). In some embodiments, a curve fitting operation may be performed in which the data points stored in operation 760 are taken as input to generate the calibration curve. In this regard, FIG. 8 shows a curve 806 that corresponds to curve 606 in FIG. 6, except that it is smoother and is the result of such a curve fitting operation. Such a curve fitting operation may be useful to extrapolate the model performance curve to higher level WAD values. For example, in FIG. 8, it may be the situation that WAD scores calculated thus far have only reached a first level ($WAD_1$ in FIG. 8). However, with the curve fitting, model performance as a function of WAD score may be estimated with a reasonable level of accuracy at least out to a second level ($WAD_2$ in FIG. 8), well past the point the area of critical interest at which an alert would be triggered (i.e., $WAD_T$ in FIG. 8). Hence, it may be possible to trigger an alert at a specified level of model performance degradation (indicated as $MP_T$), even though the scoring data has never been collected that results in that high of a WAD score being generated.

Figure 9:
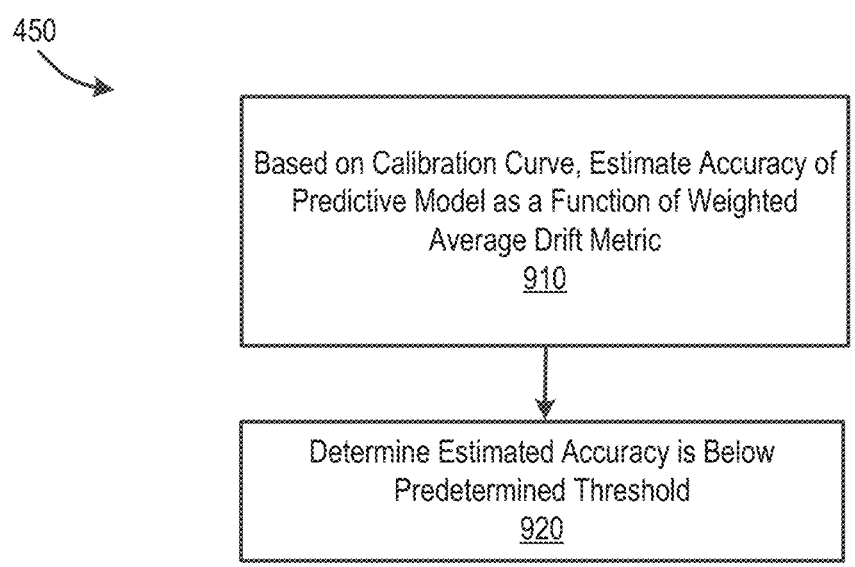
FIG. 9 is a flow diagram depicting example sub-operations, in connection with one of the operations of FIG. 7, according to some arrangements.

Referring now also to FIG. 9, FIG. 9 is a flowchart depicting a specific manner in which operation 450 of FIG. 4 may be performed using the results of the data analysis performed in FIG. 7. As will be recalled, at operation 450 in FIG. 4, the WAD score that is generated as a result of operation of 430 in FIG. 4 is evaluated based on a criterion and it is determined that the WAD score satisfies the criterion. As a result of determining that the WAD score satisfies the criterion, an alert is sent (operation 460). In some embodiments, as previously described, the criterion that is satisfied is that the WAD score exceeds a threshold $WAD_T$.

In the FIG. 9, at operation 910, based on the calibration curve, the accuracy of the machine learning model is estimated as a function of the WAD score. At operation 920, it is determined that the estimated accuracy is below a predetermined threshold (i.e., that a predetermined criterion for generating an alert is satisfied (or conversely, that the estimated accuracy is above a predetermined threshold and a predetermined criterion for not generating alert is satisfied). In this regard, it may be noted that using the calibration curve, the predetermined threshold may be specified in terms of model performance as opposed to WAD score. For example, a systems programmer need not specify any particular WAD score at which the alert to retrain to machine learning model is to be sent, in as much as the WAD score itself might not be as of much interest as the level of accuracy at which the machine learning model is currently operating. Rather, therefore, the systems programmer may specify a level of accuracy (indicated as $MP_T$, corresponding to an amount of model performance degradation), and the calibration curve may be used to translate that into a WAD-based threshold (indicated as $WAD_T$) at which the alert is to be sent.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

It is also understood that any reference to an element herein using a designation such as "first," "second," and so forth does not generally limit the quantity or order of those elements. Rather, these designations can be used herein as, a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A system comprising:
one or more processors, coupled to memory and configured to execute a supervised machine learning model having a plurality of input variables and a plurality of feature importances, each of the plurality of feature importances being associated with one of the plurality of input variables, the supervised machine learning model having been trained with training data, the supervised machine learning model processing scoring data to generate predictions based on the scoring data;
a client computing system, the client computing system configured to receive the predictions from the one or more processors and to make decisions based on the predictions; and
a supervised machine learning model analyzer system, the supervised machine learning model analyzer system configured to evaluate the supervised machine learning model using circuits that:
determine a plurality of drift metrics for the plurality of input variables, the plurality of drift metrics comparing a distribution of the training data to a distribution of the scoring data, each of the plurality of drift metrics being associated with one of the plurality of input variables,
determine, based on the plurality of drift metrics for the plurality of input variables, an overall drift metric for a combination of the plurality of input variables, the plurality of input variables being weighted in the overall drift metric in accordance with the plurality of feature importances, wherein the overall drift metric compares an overall distribution of the training data to an overall distribution of the scoring data,
generate a calibration curve depicting a performance of the supervised machine learning model in generating the predictions based on the scoring data as a function of the overall drift metric, wherein the calibration curve comprises a threshold for model performance, and generate an alert based on the overall distribution of the training data relative to the overall distribution of the scoring data, wherein the alert is generated in response to identifying that the performance of the supervised machine learning model in generating the predictions based on the scoring data is below the threshold for model performance indicated by the calibration curve, wherein the training data pertains to a first period of time, wherein the scoring data pertains to a second period of time, wherein the first period of time is earlier than the second period of time, and wherein the overall drift metric provides a measure of how far the distribution of the scoring data has drifted away from the distribution of the training data in an interval between the first and second periods of time, wherein the overall drift metric provides a leading indicator of the performance of the supervised machine learning model in generating the predictions based on the scoring data, the overall drift metric being a leading indicator as compared to information regarding actual outcomes associated with each of the predictions generated in connection with the scoring data, the information regarding the actual outcomes of each of the predictions being a lagging indicator as compared to the overall drift metric, wherein the overall drift metric is determined without using the information regarding the actual outcomes, such that an indication of the performance of the supervised machine learning model is determined and the alert is generated by the supervised machine learning model analyzer system earlier in time than possible if the information regarding the actual outcomes were utilized, wherein the training data and the scoring data both include numeric data and categorical data, and wherein the overall drift metric is a single metric that reflects overall drift of both the numeric data and categorical data, wherein the plurality of drift metrics for the plurality of input variables are each calculated as a function of $(S_{i,j}-T_{i,j})^2$, where $S_{i,j}$ and $T_{i,j}$ are the scoring data and the training data for an i-th input variable, and j is an index of summation for different categorical values of data for a same input variable, and wherein the overall drift metric is calculated as a function of either $\Sigma_i w_i \times V_i$, where $w_i$ is a feature importance for the i-th input variable and $V_i$ is a Cramer's V drift metric for the i-th input variable, or as a function of $\Sigma_i w_i \times W_i$, where $w_i$ is the feature importance for the i-th input variable and $W_i$ is a Cramer's W drift metric for the i-th input variable.

2. The system of claim 1, wherein the training data is a first set of training data, and wherein generation of the alert triggers a retraining of the supervised machine learning model, the supervised machine learning model being retrained with a second set of training data that is different from and newer than the first set of training data previously used to train the supervised machine learning model.

3. The system of claim 1, wherein the client computing system comprises a decisioning circuit configured to make the decisions based on the predictions, wherein, responsive to receiving the alert, the client computing system is configured to dynamically adjust weighting given to the output predictions given by a machine learning model server relative to other inputs considered by the client computing system.

4. The system of claim 1, wherein, responsive to receiving the alert, a machine learning model server provides a response to the client computing system that is devoid of a prediction.

5. The system of claim 1, wherein the supervised machine learning model analyzer system includes a display that displays the overall drift metric.

6. The system of claim 1, wherein the client computing system executes a decisioning algorithm that decides whether to engage in a transaction, and wherein the decisioning algorithm receives the predictions from the one or more processors to decide whether to engage in the transaction.

7. The system of claim 1, wherein the overall drift metric is a weighted average drift (WAD) metric, and wherein the weighted average drift metric is calculated using an equation having the form of $$WAD = \frac{\sum_i w_i \times V_i}{\sum_i w_i}$$

wherein the Cramer's $V_i$ metric for each of the i-th input variable is calculated using an equation having the form of $$V_i = \sqrt{\frac{Xi^2}{N \times v_i}}$$

where $Xi^2$ is a chi-square metric for the i-th input variable, N is a sample size, and vi is a degree of freedom for the i-th input variable, and wherein the chi-square metric $Xi^2$ for the i-th input variable is calculated using an equation having the form of $$X^2 = \sum_{j=1}^{K_i} \frac{(S_{i,j} - T_{i,j})^2}{T_{i,j}}$$

where $K_i$ is a number of bins for the i-th input variable.

8. The system of claim 1, wherein the overall drift metric is a weighted average drift (WAD) metric, and wherein the weighted average drift metric is calculated using an equation having the form of $$WAD = \frac{\sum_i w_i \times W_i}{\sum_i w_i}$$

and wherein the Cramer's $W_i$ metric for each of the i-th input variable is calculated using an equation having the form of $$W_i = \sqrt{\frac{X_i^2}{N^2}}$$

where $X_i^2$ is a chi-square metric for the i-th input variable, wherein the chi-square metric $X_i^2$ for the i-th input variable is calculated using an equation having the form of $$X_i^2 = \sum_{j=1}^{K_i} \frac{(T_{i,j} - S_{i,j})^2}{T_{i,j}}$$

where $K_i$ is a number of bins for the i-th input variable.

9. A method of generating an alert regarding a supervised machine learning model, the supervised machine learning model having a plurality of input variables and a plurality of feature importances, each of the plurality of feature importances being associated with one of the plurality of input variables, the supervised machine learning model having been trained with training data, the supervised machine learning model processing scoring data to generate predictions based on the scoring data, the method comprising:
  determining a plurality of drift metrics for the plurality of input variables, the plurality of drift metrics comparing a distribution of the training data to a distribution of the scoring data, each of the plurality of drift metrics being associated with one of the plurality of input variables,
  determining, based on the plurality of drift metrics for the plurality of input variables, an overall drift metric for a combination of the plurality of input variables, the plurality of input variables being weighted in the overall drift metric in accordance with the plurality of feature importances, wherein the overall drift metric compares an overall distribution of the training data to an overall distribution of the scoring data,
  generating a calibration curve depicting a performance of the supervised machine learning model in generating the predictions based on the scoring data as a function of the overall drift metric, wherein the calibration curve comprises a threshold for model performance, and
  generating the alert based on the overall distribution of the training data relative to the overall distribution of the scoring data, wherein the alert is generated in response to identifying that the performance of the supervised machine learning model in generating the predictions based on the scoring data is below the threshold for model performance indicated by the calibration curve,
  wherein the training data pertains to a first period of time, wherein the scoring data pertains to a second period of time, wherein the first period of time is earlier than the second period of time, and wherein the overall drift metric provides a measure of how far the distribution of the scoring data has drifted away from the distribution of the training data in an interval between the first and second periods of time,
  wherein the overall drift metric provides a leading indicator of the performance of the supervised machine learning model in generating the predictions based on the scoring data, the overall drift metric being a leading indicator as compared to information regarding actual outcomes associated with the each of the predictions generated in connection with the scoring data, the information regarding the actual outcomes of each of the predictions being a lagging indicator as compared to the overall drift metric, such that an indication of the performance of the supervised machine learning model is determined and the alert is generated by a machine learning model analyzer earlier in time as compared to the lagging indicator, and
  wherein the overall drift metric is a weighted average drift (WAD) metric, and wherein the weighted average drift metric is calculated using an equation having the form $$WAD = \frac{\sum_i w_i \times V_i}{\sum_i w_i}$$

where $w_i$ is a feature importance for an i-th input variable and $V_i$ is a Cramer's V metric for the i-th input variable, and wherein the Cramer's metric $V_i$ for each of the i-th input variable is calculated using an equation having the form $$V_i = \sqrt{\frac{Xi^2}{N \times v_i}}$$

where $X_i^2$ is a chi-square metric for the i-th input variable, N is a sample size, and V a is a degree of freedom for the i-th input variable, and wherein the chi-square metric $X_i^2$ for the i-th input variable is calculated using an equation having the form $$X_i^2 = \sum_{j=1}^{K_i} \frac{(S_{i,j} - T_{i,j})^2}{T_{i,j}}$$

where $S_{i,j}$ and $T_{i,j}$ are the scoring data and the training data for the i-th input variable, and $K_i$ is a number of bins for the i-th input variable and j is an index of summation for different categorical values of data within a same input variable.

10. The method of claim 9, wherein the training data and the scoring data both include numeric data and categorical data, and wherein the overall drift metric is a single metric that reflects overall drift of both the included numeric data and categorical data.

11. A system comprising:
  one or more processors, coupled to memory and configured to execute a supervised machine learning model having a plurality of input variables and a plurality of feature importances, each of the plurality of feature importances being associated with one of the plurality of input variables, the supervised machine learning model having been trained with training data, the supervised machine learning model processing scoring data to generate predictions based on the scoring data; and
  a machine learning model analyzer system, the machine learning model analyzer system configured to evaluate the supervised machine learning model using circuits that:
    determine a plurality of drift metrics for the plurality of input variables, the plurality of drift metrics comparing a distribution of the training data to a distribution of the scoring data, each of the plurality of drift metrics being associated with one of the plurality of input variables,
determine, based on the plurality of drift metrics for the plurality of input variables, an overall drift metric for a combination of the plurality of input variables, the plurality of input variables being weighted in the overall drift metric in accordance with the plurality of feature importances, wherein the overall drift metric compares an overall distribution of the training data to an overall distribution of the scoring data,
generate a calibration curve depicting a performance of the supervised machine learning model in generating the predictions based on the scoring data as a function of the overall drift metric, wherein the calibration curve comprises a threshold for model performance, and
generate an alert based on the overall distribution of the training data relative to the overall distribution of the scoring data, wherein the alert is generated in response to identifying that the performance of the supervised machine learning model in generating the predictions based on the scoring data is below the threshold for model performance indicated by the calibration curve,
wherein the overall drift metric is a weighted average drift (WAD) metric, and wherein the weighted average drift metric is calculated using an equation having the form $$WAD = \frac{\sum_i w_i \times W_i}{\sum_i w_i}$$

where $w_i$ is a feature importance for an i-th input variable and $W_i$ is a Cramer's W metric for the i-th input variable, and wherein the Cramer's $W_i$ metric for each of the i-th input variable is calculated using an equation having the form $$W_i = \sqrt{\frac{X_i^2}{N^2}}$$

where $X_i^2$ is a chi-square metric for the i-th input variable, wherein the chi-square metric $X_i^2$ for the i-th input variable is calculated using an equation having the form $$X_i^2 = \sum_{j=1}^{K_i} \frac{(T_{i,j} - S_{i,j})^2}{T_{i,j}}$$

where $S_{i,j}$ and $T_{i,j}$ are the scoring data and the training data for the i-th input variable, and $K_i$ is a number of bins for the i-th input variable and j is an index of summation for different categorical values of data within a same input variable.

12. The system of claim 11, wherein the training data is a first set of training data, and wherein generation of the alert triggers a retraining of the supervised machine learning model, the supervised machine learning model being retrained with a second set of training data that is different and newer than the first set of training data previously used to train the supervised machine learning model.

13. The system of claim 11,
wherein a client computing system comprises a decisioning circuit configured to make decisions based on the predictions,
wherein, responsive to receiving the alert, the client computing system is configured to dynamically adjust weighting given to the output predictions given by a machine learning model server relative to other inputs considered by the client computing system.

14. The system of claim 11,
wherein, responsive to receiving the alert, a machine learning model server provides a response to a client computing system that is devoid of a prediction.

15. The system of claim 11, wherein the machine learning model analyzer system includes a display that displays the overall drift metric.

16. The system of claim 11, wherein a client computing system executes a decisioning algorithm that decides whether to engage in a transaction, and wherein the decisioning algorithm receives the predictions from the one or more processors to decide whether to engage in the transaction.

* * * * *